US012769387B2

(12) United States Patent
Chebbi et al.

(10) Patent No.: US 12,769,387 B2
(45) Date of Patent: Oct. 20, 2026

(54) ENHANCED DEEP SLEEP OPERATIONS FOR SYSTEMS WITH HOMOGENEOUS CHIP ARCHITECTURES

(71) Applicant: QUALCOMM Incorporated, San Diego, CA (US)

(72) Inventors: Shriharsha Chebbi, Hyderabad (IN); Lakshmi Narayana Panuku, Hyderabad (IN); Prashanth Kumar Kakkireni, Bengaluru (IN); Arun Gothekar, Hyderabad (IN); Anirudh Ghayal, Secunderabad (IN); Naveen Kumar Narala, Bengaluru (IN)

(73) Assignee: Qualcomm Incorporated, San Diego, CA (US)

( * ) Notice: Subject to any disclaimer, the term of this patent is extended or adjusted under 35 U.S.C. 154(b) by 147 days.

(21) Appl. No.: 18/660,197

(22) Filed: May 9, 2024

(65) Prior Publication Data

US 2025/0348131 A1 Nov. 13, 2025

(51) Int. Cl.

*G06F 1/3296* (2019.01)
*G06F 1/3225* (2019.01)
*G06F 1/3234* (2019.01)
*G06F 1/3287* (2019.01)

(52) U.S. Cl.

CPC .......... *G06F 1/3296* (2013.01); *G06F 1/3287* (2013.01)

(58) Field of Classification Search

CPC .... G06F 1/3296; G06F 1/3287; G06F 1/3234; G06F 1/3225

See application file for complete search history.

(56) References Cited

U.S. PATENT DOCUMENTS

| | | | | |
|---|---|---|---|---|
| 2016/0019936 | A1* | 1/2016 | Partiwala | G11C 5/148 365/227 |
| 2018/0088961 | A1* | 3/2018 | Doshi | G06F 1/3287 |
| 2018/0267598 | A1 | 9/2018 | Pulivendula et al. | |
| 2019/0064910 | A1* | 2/2019 | Wang | G06F 1/263 |
| 2020/0058330 | A1 | 2/2020 | Chhabra et al. | |
| 2022/0083122 | A1* | 3/2022 | Rachakonda | G06F 1/189 |
| 2022/0413593 | A1 | 12/2022 | Kakkireni et al. | |

OTHER PUBLICATIONS

International Search Report and Written Opinion—PCT/US2025/023914—ISA/EPO—Jul. 30, 2025.

* cited by examiner

*Primary Examiner* — Jaweed A Abbaszadeh
*Assistant Examiner* — Gayathri Sampath
(74) *Attorney, Agent, or Firm* — Gerald P. Joyce, III

(57) ABSTRACT

This disclosure provides systems, methods, and devices for memory systems that support enhanced processing core scheduling schemes. In a first aspect, a system-on-a-chip (SoC) includes at least one processor, and a memory coupled to the at least one processor. The at least one processor is configured to cause the SoC to: initiate, by an application processor subsystem (APSS) of the SoC, deep sleep mode entry based on determining a deep sleep entry trigger has been satisfied; coordinate, between a primary chiplet and a secondary chiplet of the SoC, to collapse subsystems of the primary and secondary chiplets and to put double data rate (DDR) memory of the SoC into a self-refresh mode; trigger, by the primary chiplet, programable boot sequence (PBS) operations of a primary power management integrated controller (PMIC) of the primary chiplet; and collapse, by the primary PMIC, SoC power rails. Other aspects and features are also claimed and described.

20 Claims, 9 Drawing Sheets

ENHANCED DEEP SLEEP OPERATIONS FOR SYSTEMS WITH HOMOGENEOUS CHIP ARCHITECTURES

TECHNICAL FIELD

Aspects of the present disclosure relate generally to an apparatus and method for deep sleep modes. Some aspects may, more particularly, relate to enhanced deep sleep transition operations for multiple chip systems to enable deep sleep coordination over multiple chips of the system.

INTRODUCTION

System-on-a-chip (SoC) designs and mobile devices are becoming more complex, implementing smaller physical profiles with ever-decreasing conductor path dimensions for transferring data at higher rates than predecessor SoCs. Operating at higher speeds with greater physical design constraints may increase power demands.

Mobile devices are capable of running complex software applications and often have multiple wireless access technologies for communicating voice and data using both short-range and long-range wireless systems. With this size reduction and substantial increase in processing power and memory, the power demand for new mobile devices is ever increasing. Additionally, the push for miniaturization drives down the size of batteries to fit in more smaller and complex devices. Thus, battery life and power management are an important aspect to continue to advance mobile innovation.

Several power saving mechanisms have been proposed to extend battery life in mobile devices, such as in single-chip SoCs. One such method that has been implemented is the use of sleep or idle modes in the mobile device. For example, when a device is not currently engaging in wireless communications or not performing processing activities, one or more components of the SoC may be put to sleep to conserve power. However, putting components to sleep requires coordination across multiple components of the SoC, which can create challenges for meeting wake-up demands, such as to quickly restoring power to the components for future operations.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects disclosed herein describe enhanced deep sleep architectures and designs for deep sleep operations for multiple chip SoC architectures. The enhanced deep sleep architectures and designs enable coordination of deep sleep entry and transition operations across multiple chips of a SoC to enable increased functionality and power savings performance. In the aspects described herein, enhanced deep sleep architectures and deep sleep operations for both homogenous and heterogenous multiple chip SoC architectures are described along with the corresponding SoC architecture for such designs.

In one aspect of the disclosure, a system-on-a-chip (SoC) includes at least one processor, and a memory coupled to the at least one processor. The at least one processor is configured to cause the SoC to: initiate, by an application processor subsystem (APSS) of the SoC, deep sleep mode entry based on determining a deep sleep entry trigger has been satisfied; coordinate, between a primary chiplet and a secondary chiplet of the SoC, to collapse subsystems of the primary and secondary chiplets and to put DDR memory of the SoC into a self-refresh mode; trigger, by the primary chiplet, programable boot sequence (PBS) operations of a primary power management integrated controller (PMIC) of the primary chiplet; and collapse, by the primary PMIC, SoC power rails as part of the PBS operations.

In another aspect of the disclosure, a method for deep sleep for a system-on-chip (SoC), the method comprising: initiating, by an application processor subsystem (APSS) of the SoC, deep sleep mode entry based on determining a deep sleep entry trigger has been satisfied; coordinating, between a primary chiplet and a secondary chiplet of the SoC, to collapse subsystems of the primary and secondary chiplets and to put DDR memory of the SoC into a self-refresh mode; triggering, by the primary chiplet, programable boot sequence (PBS) operations of a primary power management integrated controller (PMIC) of the primary chiplet; and collapsing, by the primary PMIC, SoC power rails as part of the PBS operations.

In an additional aspect of the disclosure, a system-on-a-chip (SoC) includes at least one processor, and a memory coupled to the at least one processor. The at least one processor is configured to cause the SoC to: initiate, by an application processor subsystem (APSS) of the SoC, deep sleep mode entry based on determining a deep sleep entry trigger has been satisfied; coordinate, between a primary chiplet and a secondary chiplet of the SoC, to collapse subsystems of the primary and secondary chiplets and to put double data rate (DDR) memory of the SoC into a self-refresh mode; trigger, by the primary chiplet, programable boot sequence (PBS) operations of a primary power management integrated controller (PMIC) of the primary chiplet; and coordinate, between the primary PMIC and a secondary PMIC of the secondary chiplet, to execute the PBS operations and second PBS operations of the secondary PMIC and to collapse SoC power rails.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may n come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
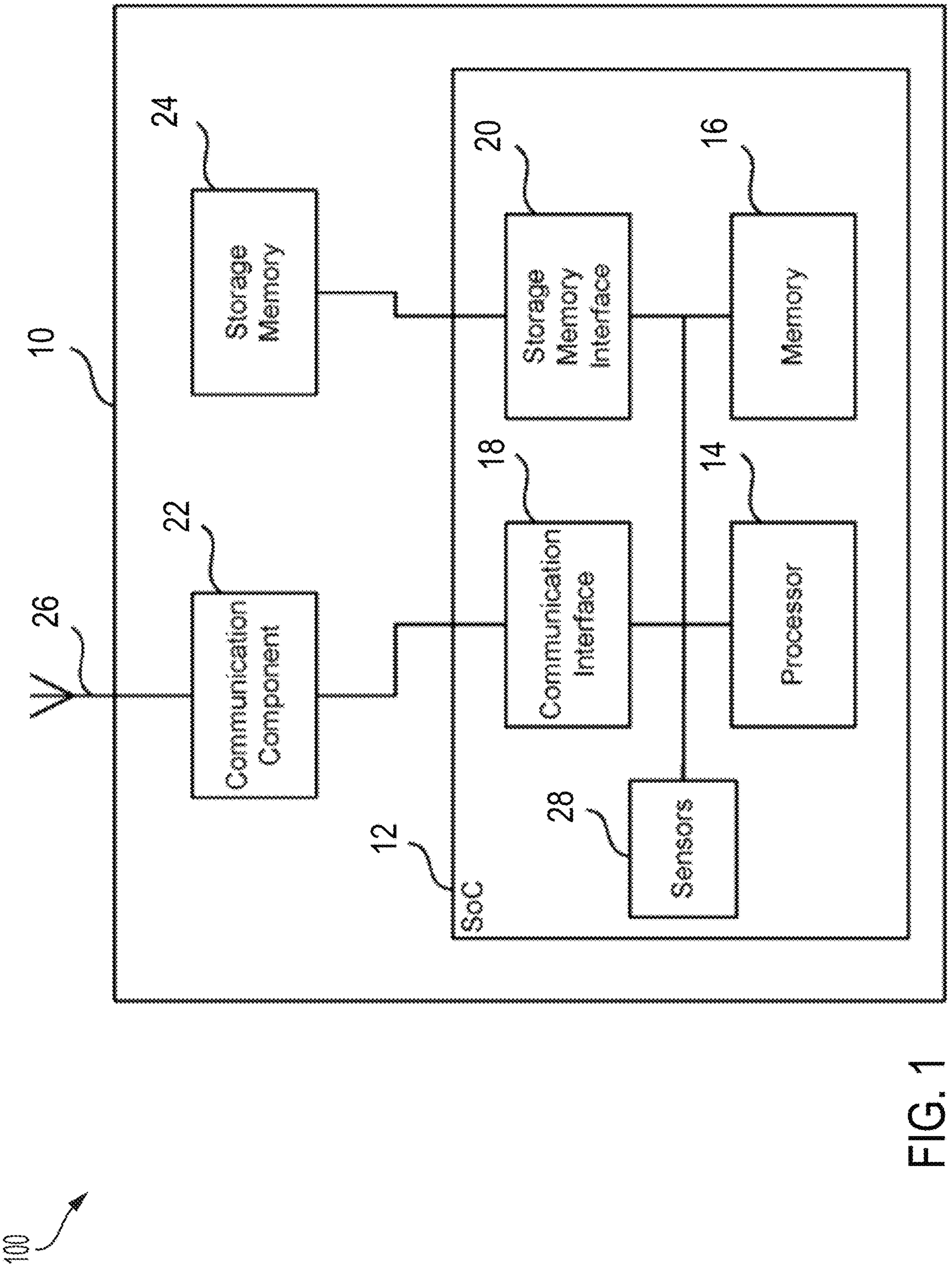
FIG. 1 is a block diagram illustrating a system including a computing device according to some aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

The term "system-on-a-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

As used herein, the term "computing device" refers to any one or all of vehicle management systems, display subsystems, driver assistance systems, vehicle controllers, vehicle system controllers, vehicle communication system, infotainment systems, vehicle display systems or subsystems, vehicle data controllers or routers, cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, vehicle controllers, and similar electronic devices which include a programmable processor and memory and circuitry configured to perform operations as described herein.

As used herein, the term "flip flop" refers to a circuit that has two stable states and can be used to store state information. A flip flop may include at least two logic gates to perform storage functions. A group of at least two flip flops in a series configuration may be used as a shift register to shift state information bit by bit serially through the flip flops. In some embodiments, a flip flop may be referred to as a latch.

As used herein, the term "spatially" may refer to the physical orientation and/or location of a system component or area within the physical layout and stack-up or a computing device. For example, a group of flip flops may be referred to as being spatially associated with a grid portion of an SoC, where an SoC is logically divided into various portions with respect to the SoC physical layout and/or stack-up. A group of flip flops may be spatially associated with a grid portion such that the group of flips flops may be physically located within the logical boundaries of the grid portion. As another example, a group of flip flops, or a group of logic gates, may be spatially associated with a scan chain section, and therefore the scan chain section may be spatially associated with a corresponding grid portion that is spatially associated with the group of flip flops.

As used herein, the term "grid portion" refers to a physical portion of an SoC in three-dimensional space. For example, a grid portion may be a volume of an SoC fabrication, in which the grid portion is distinct from other grid portions as arranged in a top-down view of the SoC fabrication. A grid portion may include one or more SoC stacks or layers, or a portion of one or more stacks or layers within an SoC. In some embodiments, a grid portion may be referred to as a region of an SoC. In some embodiments, a portion of the SoC may not be a grid portion, but may be a physical portion of the SoC having a defined volume and/or shape distinct from a grid configuration. For example, a portion of the SoC may be dimensionally rectangular, or may be any other shape and volume as determined in a design stage of an SoC. Thus, an SoC may be logically divided into any number of portions, or regions, each having any variety of volumes, such that a single SoC may be logically divided into at least two portions.

Various embodiments include methods, system-on-a-chip (SoC) designs, processing devices, and memory that are configured to implement the methods for monitoring in-field characteristics of an SoC. Various embodiments may be configured to monitor in-field characteristics by implementing a scan chain to sequentially input test data into groups of logic gates corresponding to physical regions of an SoC, and by measuring on-chip thermal, IR drop, and power-grid reliability in response to the scan chain inputting test data.

Continuous and in-field monitoring of on-chip thermal characteristics, IR drop, and power grid reliability is an important safety and security requirement in certain types of systems, processors and SoCs. These in-field characteristics may be especially critical in systems where human safety is a priority, such as automotive vehicle systems. Failure or unexpected degradation (e.g., through excessive IR drop, power grid degradation, electromigration, etc.) of an SoC controlling safety features or other features for normal operation may occur with too little or no warning of an impending failure or error.

Existing sensors, such as temperature and voltage sensors, positioned throughout the physical profile of an SoC can provide read outs of the temperature and voltage values under a given workload. However, execution of a typical workload performing common operations may not exercise remote and discretized logic in the SoC sufficient to enable in-service monitoring of all regions of the SoC. For example, a workload may include functional data patterns activating combinational logic corresponding to a GPU, which may create power demands within a region of the SoC including the GPU for a certain period of time. As another example, a workload may include functional data patterns activating combinational logic corresponding to a CPU, which may create power demands within a different region of the same SoC for a period of time. While any one workload functional pattern is being implemented, the remaining portions of the SoC may be inactive or may not fully utilize the extent of the combinational logic for specific SoC functions. Thus, conventional workloads may not be able to provide rigorous enough power draw (i.e., sufficient temperature conditions) to uncover, or highlight, potential issues within an SoC that may be caused by thermal and electrical conditions. Thus, measuring temperature and voltage values under conventional workloads may not help in isolating and specifically identifying an exact reason for an SoC error or failure (e.g., aged power delivery network, increased IR drop values, on-chip or off-chip power attacks, hard errors, etc.).

Conventional scan chain testing seeks to provide more rigorous testing of an SoC as compared to functional workloads during normal operations. Conventional scan chains typically activate all of the flip flops within a scan chain layer simultaneously, causing all of the associated combinational logic to be activated simultaneously in response. As such, measuring thermal and electrical characteristics during the scan chain activation may provide some insight as to potential overarching issues within an SoC (e.g., thermal "hot spots," power constraints). However, because conventional scan chains are activated in an all-or-nothing manner, conventional scan chains may not allow for identifying specific sources of any observed problems or out-of-limit conditions. For example, activating a conventional scan chain may enable detecting a thermal hot spot; however, the specific circuitry within the SoC causing the thermal issue may not be identifiable based on conventional scan chain activations.

Various embodiments address safety and security considerations through continuous and in-field monitoring of on-chip thermal, power distribution network, and power grid reliability. Various embodiments may identify errors or failures associated with aging of the power grid on the SoC, which over time can lead to in-field functional failures due to poor voltage delivery. Various embodiments may identify trojans or hard attacks, which can cause high power leakage paths or burnouts when a particular logic gate is activated. Various embodiments may further characterize the thermal paths from individual gates to the rest of the SoC to confirm expected operation and no presence of off-chip influences (e.g., a redistribution layer).

Various embodiments include an SoC design particularly suitable for safety and security critical applications. For example, various embodiments may include circuitry, mechanisms, and methods for activating a selected and specific portion of an SoC design while operating in the field. Various embodiments may include circuitry and mechanisms to detect any changes in the SoC power delivery network (or power grid), such as caused by aging or attacks, by capturing the electrical response within the SoC caused by activating a specific design segment within the SoC. As another example, some embodiments may include circuitry and mechanisms to detect changes in the thermal path (i.e., on and off chip) by capturing the thermal response after activating a specific design segment within the SoC. As a further example, some embodiments may include circuitry and mechanisms to detect any trojans or hard fails in the design during in-field operation.

Various embodiments include separating a scan chain design into multiple sections, and clock gating each individual section. Separating a scan chain design into multiple sections may allow for the creation and testing of highly localized, power-dense regions on an SoC. By powering and/or activating each scan chain section separately, sequentially, or in any other configuration, various embodiments enable measuring the thermal and electrical responses present in other unpowered and/or inactive sections within the SoC. This allows in-field testing to isolate potential issues (e.g., aged power delivery network, increased IR drop values, on-chip or off-chip power attacks, hard errors, etc.) based on the responses measured throughout an SoC resulting from each individually activated scan chain section.

In some embodiments, a scan chain may be divided into separate logically located grid sections corresponding to a physical profile of an SoC. For example, during the physical design stage of an SoC, the physical profile of the SoC may be decomposed into a grid having different grid portions. Each grid portion may be logically overlaid on top of the SoC physical profile, such that each logical grid portion may be associated with circuitry within the corresponding physical area of the SoC. Thus, the flip flops of a scan chain layer may be separated similarly based on a grid configuration in which each portion of the grid may be associated with a number of flip flops. The flip flops in each grid may be chained—or stitched—together to create a single scan chain section, or segment, in which each segment may be activated individually to produce and measure a thermal and electrical responses at each other segment of the grid-based scan chain. Thus, thermal grid-aware scan stitching may stitch together flip flops for the purpose of determining thermal characteristics in a grid or grid-like configuration.

The grid-based scan chain segments may be clocked to individually activate each scan chain segment for purposes of measuring the corresponding responses at each other grid portion. For example, a scan chain layer may be designed to include clock gates before and after each portion of the grid (i.e., to isolate each scan chain segment). This allows for the gating of the clock propagation to downstream and upstream logic (i.e., the other flip flops in other portions of the grid and their associated combinational logic). Thus, various embodiments may provide a clock signal to a single group of flip flops associated with a grid portion, while gating the clock signal from other flip flops associated with other grid portions.

After design and tape-out, each clock gate associated with each grid portion may be serially chosen and activated through software to sequentially activate each chain of corresponding flip flops. For example, clocking one grid portion (i.e., the flip flops physically associated with that logical grid portion) may produce responses that are measurable by temperature and voltage sensors in other grid portions that have their clocks gated. Each portion of the grid may be sequentially activated by a clock gate controller to allow the SoC to determine the responses at each clocked-gated grid portion. The temperature and voltage measurements may be used for system characterization to identify potential issues caused by the clocked flip flops associated with an activated grid portion. In some embodiments, the thermal and electrical characteristics of an activated grid portion may be measured individually, or along with other grid portions that have their clocks gated. Thus, a scan-chain grid configuration can enable measuring thermal and electrical responses across any combination of grid portions, clocked or clock-gated, in response to activating any individual grid portion or any combination of grid portions. For example, one grid portion may be activated, and thermal and electrical responses may be measured across the activated grid portion, another individual grid portion, multiple different grid portions, or all grid portions simultaneously.

In some embodiments, the clock signaling used to activate each individual grid portion, or scan chain section, may be a high-speed clock signal (e.g., turbo-shifted clock, 3.2 GHz clock). Shifting the data input into each group of flip flops at high frequencies can cause the SoC to draw power at levels higher than in normal operations (referred to herein sometimes as "high power") to implement the combinational logic associated with each clocked flip flop. By increasing the power requirements for shifting data into the flip flops at high speeds, thermal and electrical responses produced at other sections of the SoC may be more readily measurable, and therefore any associated errors or attacks may be more easily identifiable. Thus, various embodiments enable briefly activating individual grid portions while characteristic measurements (e.g., temperature, voltage, current, etc.) are obtained in other grid portions, and rapidly repeating this process for many or all individual grid portions so that measured characteristics are consistent on average with normal operations (in which many grids are activated) while enabling changes in measurements to be associated with particular one or few grid portions. This capability enables potential performance of life-limiting issues that occur during normal operation to be detected while at the same time enabling the sources of such issues to be localized to one or a few grid portions.

FIG. 1 illustrates a system including a computing device 10 suitable for use with various embodiments. The computing device 10 may be included in a mobile computing device, such as a wireless communication device, according to one or more aspects of the disclosure. As other examples, the computing device 10 may be included in an MP3 player, a laptop computer, or a non-portable electronic device such as a desktop computer, a game player, a television (TV), a media player, or an automotive computer system. The computing device 10 may include an SoC 12 with a processor 14, a memory 16, a communication interface 18, a storage memory interface 20, and sensors 28. The computing device 10 may further include a communication component 22, such as a wired or wireless modem, a storage memory 24, and an antenna 26 for establishing a wireless communication link. The processor 14 may include any of a variety of processing devices, for example a number of processor cores.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster. The processors 14 may control the general operations of SoC 12 and optionally the specific actions of any of the components thereof. The processors 14 may be implemented, for example, with a microprocessor or a central processing unit (CPU), or an application-specific integrated circuit (ASIC).

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. As illustrative examples of volatile memories, the one or more memories 16 may include a dynamic random access memory (DRAM) and a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (SCRAM), or a NAND flash memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24. The storage memory interface 20 may include or correspond to a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, or a memory stick.

The sensors 28 may be communicatively coupled to the processor 14, the memory 16, the communication interface 18, and the storage memory 20 via a bus or other communication link. The sensors 28 may include thermal sensors and/or voltage sensors physically located within the SoC 12. The sensors 28 may measure thermal and electrical characteristics (e.g., temperature and voltage values) throughout the SoC 12 during testing and normal operating procedures as described by embodiments. Temperature values and voltage values measured by the sensors 28 may be conveyed to the processor 14 for processing, stored in the memory 16, and/or conveyed from the SoC 12 through the communication interface 18 to other components in the computing device 10.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10. For example, the communication interface 18 may be used to convey measured in-field characteristics to the communication component 22. The communication component 22 may relay the measured in-field characteristics to external additional computing devices for purposes of diagnosing any errors based on the in-field characteristics. Similarly, the memory 16, storage memory interface 20, and storage memory 24 may store and convey the measured in-field characteristics and other associated data as according to the various embodiments.

In the aspects described herein, a deep sleep mode or deep sleep state corresponds to a sleep state where memory, such as double data rate (DDR) memory, of the SoC is in a self-refresh state and all other SoC power rails are off (e.g., in a powered down state/disconnected from power supply). In some such implementations, a logic rail (e.g., LX or CX rails) may be off, a crystal oscillator (XO) rail (e.g., XO rail) may be off, and a memory rail (e.g., MX rail) may be off. In some other implementations, the memory rail may be at retention level for DDR self-refresh. In some aspects, the deep sleep state corresponds to a sleep state that is deeper than a rock bottom sleep (RBS) state and has a quick boot wakeup ability and DDR memory retention. The deep sleep state may extend to all component or subsystems of the SoC, such as always-on subsystems (AOSS). For example, in a particular aspect, the quick boot wakeup of the deep sleep state from PMIC boot includes early Audio operations within 700 msec, display within 700 msec, and camera within 1200 msec from PMIC boot. The RBS may be a low power mode for the SoC such that it is non-functional, but that the state of the SoC is retained for "immediate" return to operation once clocks and voltages are restored.

Figure 2:
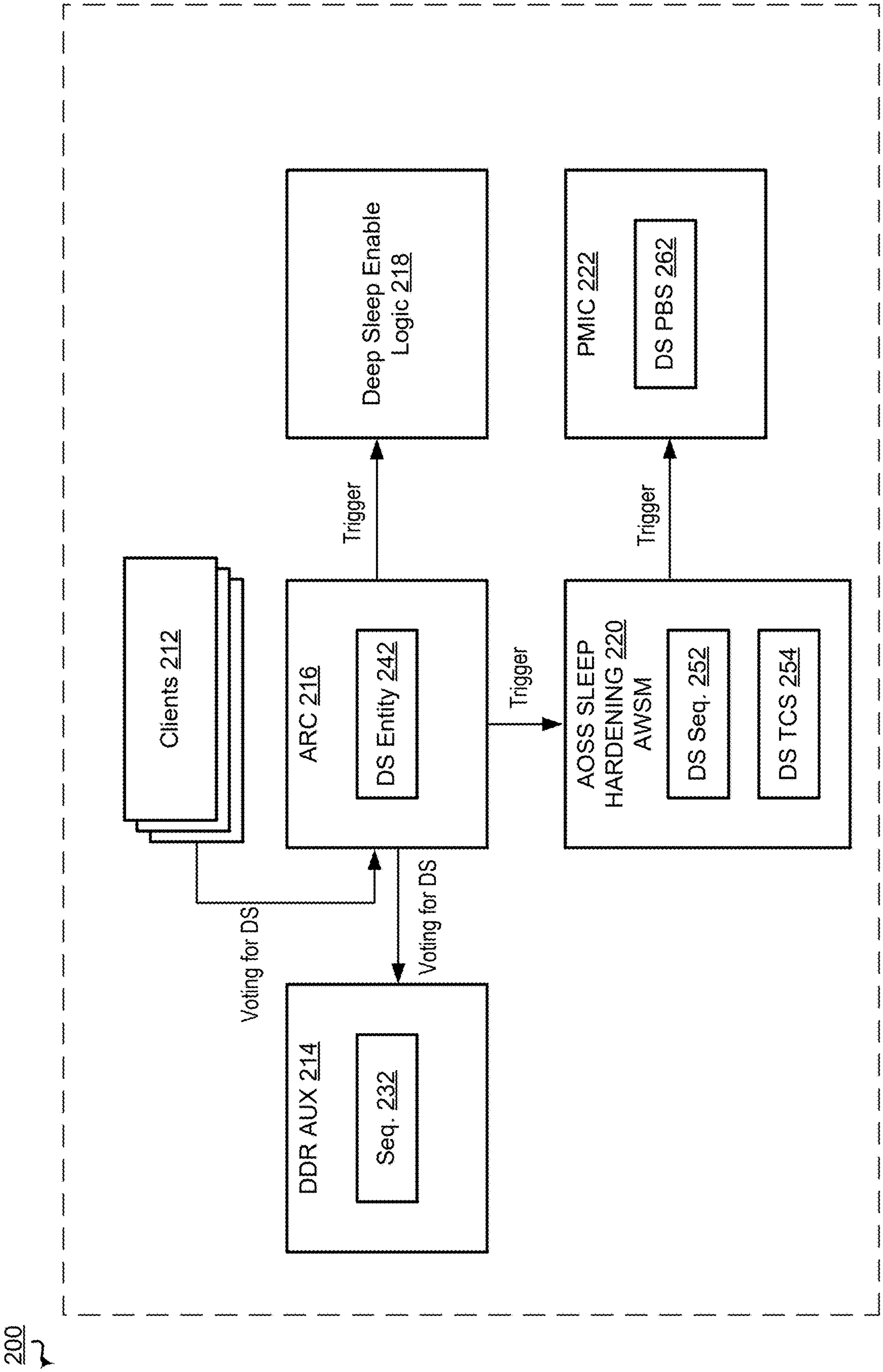
FIG. 2 is a block diagram illustrating an example of a deep sleep architecture for a single die according to some aspects of the disclosure.

FIG. 2 is a block diagram 200 illustrating an example of deep sleep architecture for a circuit or system, such as the SoC of FIG. 1 and/or any components thereof. In FIG. 2, the deep sleep architecture is located on a single die, tile, or chiplet of the circuit or system. For example, a chiplet or die of the system or circuit includes deep sleep logic to enter the components or subsystems on the chiplet or die into a deep sleep mode or state.

In the example of FIG. 2, the circuit architecture of the SoC 202 includes a plurality of clients 212, a DDR AUX 214, an Aggregated Resource Controller (ARC) 216, deep sleep enable logic 218, AOSS sleep hardening logic 220, and a power management integrate controller (PMIC) 222.

The plurality of clients 212 include a plurality of requesting services or components of the SoC 202. Exemplary clients may include components of subsystems of the SoC 202, applications or services supported by the SoC 202, or a combination thereof. The plurality of clients 212 are configured to determine whether or not they are able to, or want to, enter a lower power state or sleep mode, such as deep sleep. The plurality of clients 212 are configured to vote or otherwise indicate to the SoC 202, such as to the ARC 216, that they wish or are able to enter a low power or sleep state, such as a deep sleep mode or state.

The DDR AUX 214 includes or corresponds a DDR memory manager or controller. For example, the DDR AUX 214 is configured to control and coordinate transition of a DDR memory and DDR memory controller. The DDR AUX 214 may be configured to control performance and power states of the DDR memory (not shown) of the SoC 202.

The DDR AUX 214 may include a sequencer 232. The sequencer 232 may include or correspond to a finite state machine (FSM), a microcontroller with firmware, a programmable FSM, or a logical sequence or series of step for coordinating one or more transitions of the DDR memory.

The DDR AUX 214, such as the sequencer 232 thereof, is configured to vote or otherwise indicate to the SoC 202, such as to the ARC 216, that the DDR memory is in or is able to enter a low power or sleep state, such as a refresh state or mode.

The ARC 216 (e.g., DS ARC) is communicatively coupled to the plurality of clients 212 and the DDR AUX 214. For example, the ARC 216 is configured to send and receive messages with each of the plurality of clients 212 and the DDR AUX 214.

The ARC 216 may include or correspond to a container for coordinating the transition of various SoC resources, such as physical resources and/or logical resources. Examples of physical resources include voltage domain resources, clock domain resources, transitions between performance states or on/off, etc., and examples of logical resources include logical state resources, such as DDR power states, SoC power states, etc.

The ARC 216 may include a deep sleep entity 242 (aka DS entity). The deep sleep entity 242 may include or correspond to a finite state machine (FSM), a microcontroller with firmware, a programmable FSM, or a logical sequence or series of step for coordinating a transition to the deep sleep mode.

The ARC 216, such as the deep sleep entity 242 thereof, may be configured to determine whether to transition to a deep sleep state based on input from components of the SoC 202. For example, the deep sleep entity 242 may receive indications, such as votes, from the DDR AUX 214 and/or clients of the plurality of clients 212 which indicate the components/clients of the SoC 202 are ready for or wish to transition to a deep sleep state. The deep sleep enable logic 218 is configured to control and perform deep sleep enable operations.

The AOSS sleep hardening logic 220 includes or corresponds to a state manager for components of the SoC. For example, the AOSS sleep hardening logic 220 may include or correspond to a wake/sleep manager, such as a AOSS sleep hardening wake/sleep manager (AWSM). The AOSS sleep hardening logic 220 is configured to prepare (e.g., harden) components of the SoC 202 for transition to deep sleep. To illustrate, the AOSS sleep hardening logic 220 may prepare clients and components for being disconnected from power.

The AOSS sleep hardening logic 220 may include a deep sleep sequencer (DS Seq.) 252 and a DS TCS 254. The deep sleep sequencer (DS Seq.) 252 may include or correspond to a finite state machine (FSM), a microcontroller with firmware, a programmable FSM, or a logical sequence or series of step for preparing clients and/or components for deep sleep.

The PMIC 222 includes or corresponds to circuitry configured to control power delivery throughout the SoC 202. The PMIC 222 is configured to provide power to clients and components of the SoC 202 and to implement power states of the SoC 202. For example, the PMIC is configured to control operation of one or more power rails of the SoC 202, such a logic power rail, a memory power rail, a crystal oscillator power rail, etc., and control of the power rails may include switching between configurations of the power rails of the SoC 202 and/or of circuitry of the PMIC 222, which may be associated with particular power modes, such as on, low power, sleep, deep sleep, etc.

The PMIC 222 may include a deep sleep programable boot sequence (DS PBS) 262. The DS PBS 262 may include or correspond to a logical sequence or series of steps for collapsing power rails and transitioning the SoC 202 to the deep sleep state. The PMIC 222, such as the DS PBS 262, may be triggered by the AOSS sleep hardening logic 220 and/or the ARC 216.

Although the DDR AUX 214, the ARC 216, and the AOSS sleep hardening logic 220 are illustrated as separate components, in some implementations two or more of the DDR AUX 214, the ARC 216, and the AOSS sleep hardening logic 220 are unitary or part of the same component. Each of the DDR AUX 214, the ARC 216, and the AOSS sleep hardening logic 220 may be referred to generally as deep sleep logic.

The sequencer 232, the deep sleep entity 242, the DS sequencer 252, and the DS TCS 254 may each include or correspond to local resources of the deep sleep logic, and/or the SoC 202. The DS PBS 262 of the PMIC 222 may include or correspond to a non-local resource of the deep sleep logic, and/or the SoC 202, such as a backend resource.

During operation, the SoC 202 determines to enter a deep sleep state based on inputs from the plurality of clients 212 and from the DDR AUX 214. For example, clients of the plurality of clients 212 send votes to the deep sleep entity 242 of the ARC 216 for aggregation. The votes may indicate the clients are able to be transition to the deep sleep state or a suspend to RAM mode.

Additionally, the DDR AUX 214 sends a vote to the deep sleep entity 242 of the ARC 216 indicating that the DDR memory is in or capable of transitioning to the low-power or self-refresh mode or suspend to RAM mode.

The ARC 216, such as the deep sleep entity 242 thereof, determines whether to transition to the deep sleep mode based on the received votes from the plurality of client and from the DDR AUX 214. Responsive to determining to transition to the deep sleep mode, the ARC 216, such as the deep sleep entity 242 thereof, sends a trigger message to the deep sleep enable logic 218, to the AOSS sleep hardening logic 220, or both. For example, the deep sleep entity 242 transmits a deep sleep enable logic trigger message to the deep sleep enable logic 218 to trigger performance of deep sleep enable operations by the deep sleep enable logic 218. Additionally, or alternatively, the deep sleep entity 242 transmits a deep sleep branch event trigger message to the AOSS sleep hardening logic 220 to trigger performance of deep sleep hardening operations by the AOSS sleep hardening logic 220 and transition to the deep sleep state.

The AOSS sleep hardening logic 220 may perform sleep hardening operations responsive to and optionally based on receiving the deep sleep branch event trigger message from the ARC 216. For example, the AOSS sleep hardening logic 220 may prepare the plurality of clients 212 and/or subsystems of the SoC for deep sleep, such as to be disconnected from power and to suspend their operations and data to RAM.

Transition to the deep sleep state may include or correspond to performance of the DS PBS 262 by the PMIC 222 responsive to triggering by the AOSS sleep hardening logic 220.

Figure 3:
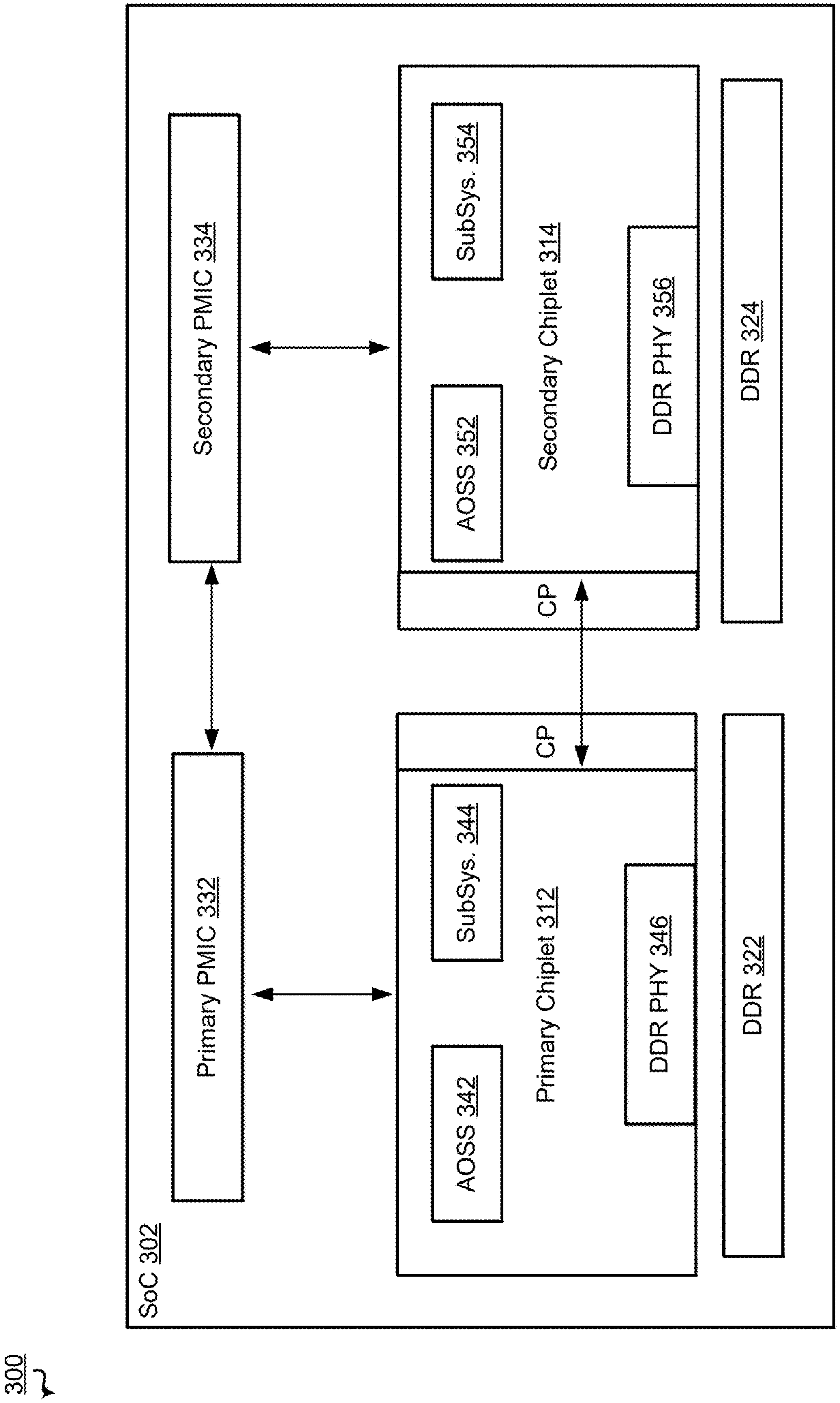
FIG. 3 is a block diagram illustrating an example of an enhanced deep sleep architecture for multiple chip SoCs according to some aspects of the disclosure.

Referring to FIG. 3, FIG. 3 is a block diagram of an example of a multiple chip SoC architecture with homogenous chiplets. In FIG. 3, a SoC 300 that is configured for enhanced deep sleep operations is illustrated.

The SoC 300 includes multiple chiplet or dies. In the example of FIG. 3, two chiplets and dies are illustrated for simplicity, that is a first chiplet on a first die and a second chiplet on a second die connected to each other via die-to-die (D2D) interface and where the chiplets are the same type. In other examples, the SoC 300 may include more chiplets of the same type. In the particular example illustrated in FIG. 3, the SoC 300 includes a primary chiplet 312 on a primary die and a secondary chiplet 314 on a secondary die with the exact same subsystems and components. The SoC 300 further includes a primary DDR memory 322 and a primary PMIC 332, both associated with the primary chiplet 312, and includes a secondary DDR memory 324 and a secondary PMIC 334, both associated with the secondary chiplet 314.

The SoC 300 includes similar subsystems and components described with reference to the SoC of FIG. 2. For example, the primary chiplet 312 of the SoC 300 includes a first AOSS 342 (e.g., first AOSS sleep hardening logic), first subsystems 344, and a first DDR controller 346 (DDR PHY). The secondary chiplet of the SoC 400 includes a second AOSS 352 (e.g., second AOSS sleep hardening logic), second subsystems 354, and a second DDR controller 356 (DDR PHY).

The primary chiplet 312 and the secondary chiplet 314 of the SoC 400 communicate with each other via control plane (CP) transmissions across a control plane, such as a die-to-die (D2D) interface. For example, components of the primary chiplet 312 and the secondary chiplet 314 of the SoC 400 may communicate with each other to engage in SoC operations, including client and power state operations.

As one example, first subsystems 344 and the second subsystems 354 may communicate with each other. To illustrate, the first subsystems 344 (e.g., primary subsystems) and the second subsystems 354 (e.g., secondary subsystems) communicate with each other to provide services to clients of the SoC 400. As another example, components of the first AOSS 342 (e.g., primary AOSS) and the second AOSS 352 (e.g., secondary AOSS) may communicate with each other. To illustrate, the first AOSS 342 and the second AOSS 352 communicate with each other to coordinate deep sleep operations for the SoC 400, as described further herein. The first AOSS 342 and the second AOSS 352 may communicate with each other and perform operations similar to those described with reference to AOSS sleep hardening logic 220 of FIG. 2, and described further with reference to FIGS. 5-8.

Additionally, the PMICs of the SoC 400 communicate with each other. For example, the primary PMIC 332 and the secondary PMIC 334 communicate with each other to provide power to their respective chiplet. To illustrate, the primary PMIC 332 and the secondary PMIC 334 communicate with each other to coordinate deep sleep operations for the primary chiplet 312 and the secondary chiplet 314 of the SoC 400, as described further herein.

SoC architectures with Homogenous Chiplets include multiple identical chiplets (or dies) with the same components or subsystems (SSs). For example, each chiplet or die of the SoC may have the exact same subsystems and IPs, and such components may be arranged or positioned the same or similar. Conversely, SoC architectures with Heterogenous Chiplets include one or more individual chiplets that are unlike each other with respect to subsystems and IPs. For example, the SoC may include a primary die or chiplet that has subsystems or IPs that may not be present in at least one other chiplet of the SoC.

Different types of SoCs, such as with different chiplet configurations may have different subsystem arrangements, such as memory arrangements (e.g., DDR arrangements). For example, SoCs architecture with Homogenous Chiplets may include an Inter Chiplet Hardware Interleaving (ICHI) DDR configuration or an Independent DDR chiplet configuration.

The ICHI DDR configuration enables chiplet integration across the chiplets or dies, and may enable components on one chiplet to use a DDR memory on another chiplet, by using an interface, such as an Advanced Interface Bus (AIB).

For example, the first subsystems 344 may communicate with the secondary chiplet 314 to utilize the secondary DDR memory 324, and the second subsystems 354 may communicate with the primary chiplet 312 to utilize the primary DDR memory 322.

The independent DDR configuration does not enable chiplet integration across the chiplets or dies for memory access, and the components on each die would utilize the corresponding DDR memory on the chiplet/die. The components of the different chiplets may still communicate with each other across the chiplets or dies, such as via a die-to-die interface, but not for memory operations.

For example, the first subsystems 344 may communicate with the secondary chiplet 314 for operations, but the first subsystems 344 only utilize the primary DDR memory 322, and the second subsystems 354 may communicate with the primary chiplet 312 for operations, but the second subsystems 354 only utilize the secondary DDR memory 324.

As used herein, the terms of die and chiplet may be one and the same and refer to the same processor or IC that is a discrete part or portion of the SoC. For example, the primary chiplet may include or correspond to a primary die or vice versa.

Figure 4:
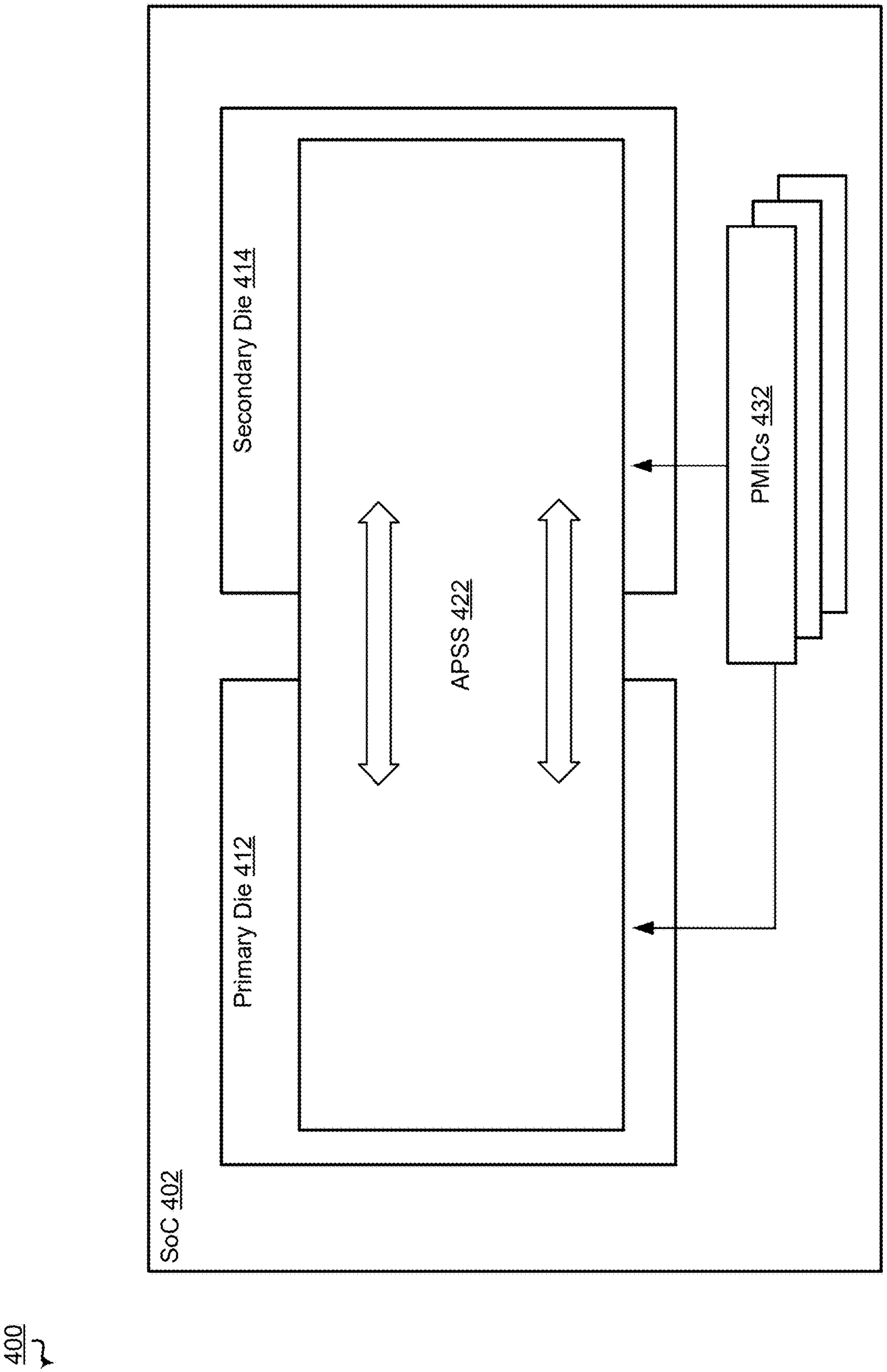
FIG. 4 is a block diagram illustrating an example of an enhanced deep sleep architecture for multiple chip SoCs according to some aspects of the disclosure.

Referring to FIG. 4, FIG. 4 is a block diagram of an example of a multiple chip SoC architecture with homogenous chiplets. In FIG. 4, a SoC 400 that is configured for enhanced deep sleep operations is illustrated. FIG. 4 depicts an example or design methodology and operation of the SoC 300 of FIG. 4.

The SoC 400 includes multiple chiplet or dies. In the example of FIG. 4, two chiplets and dies are illustrated for simplicity, that is a first chiplet on a first die and a second chiplet on a second die connected to each other via die-to-die (D2D) interface and where the chiplets are the same type. In other examples, the SoC 400 may include more chiplets of the same type. In the particular example illustrated in FIG. 4, the SoC 400 includes a primary chiplet on a primary die 412 and a secondary chiplet on a secondary die 414 with the exact same subsystems and components. The SoC 400 further includes a plurality of PMICs 432 associated with the chiplets of the SoC 400.

In FIG. 4, the SoC 400 is shown with an application processor subsystem (APSS) 422 the spans both chiplets or dies. The APSS 422 may be a split subsystem between the dies, such as have common applications/subsystems across the multiple chiplets. In the example of FIG. 4, the DDR memories may have an independent DDR configuration. In other examples, the DDR memories may have an Inter Chiplet Hardware Interleaving (ICHI) DDR configuration.

Figure 5:
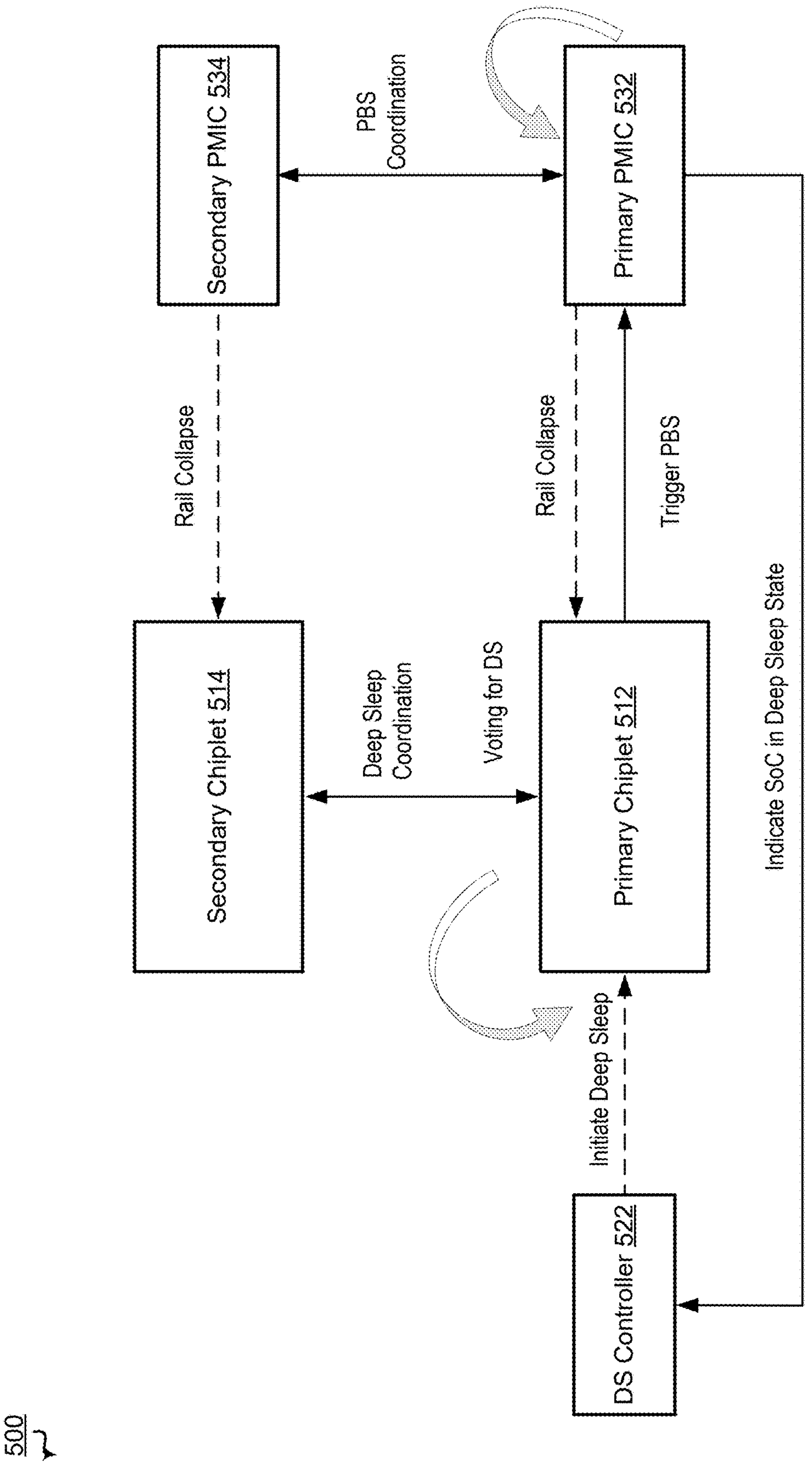
FIG. 5 is a block diagram illustrating an example of an enhanced deep sleep architecture for multiple chip SoCs according to some aspects of the disclosure.

Referring to FIG. 5, FIG. 5 is a block diagram of an example of a multiple chip SoC architecture with homogenous chiplets. In FIG. 5, a SoC 500 that is configured for enhanced deep sleep operations is illustrated. FIG. 5 depicts an example sequence of enhanced deep sleep operations for multiple chip SoC architecture with homogenous chiplets.

As an overview of the sequence of enhanced deep sleep operations, a controller determines a deep sleep trigger and triggers chiplets of the SoC, which may be referred to as a deep sleep trigger sequence. The chiplets of the SoC coordinate for collapsing subsystems of the chiplets and put their corresponding DDR memories into a self-refresh mode, which may be referred to as a deep sleep entry sequence. In some implementations a particular chiplet (e.g., a first or primary chiplet) may be configured to control the actions of the other chiplets, such act as a master chiplet or die to other chiplets/dies.

Near or at the end of the deep sleep entry sequence, one of the chiplets triggers a deep sleep sequence of a particular PMIC which may be referred to as a deep sleep transition sequence. The particular PMIC executes its deep sleep sequence to transition the SoC, or a chiplet thereof into the deep sleep mode. The deep sleep sequence may include collapsing power rails or adjusting power rails to lower power states, as illustrative examples. After performance of the deep sleep transition sequence, the particular PMIC informs the controller of completion of the deep sleep transition operations and that the chiplet or SoC is in the deep sleep mode or state.

In implementation where the SoC includes multiple PMICs, a primary PMIC coordinates with secondary PMICs to perform the deep sleep transition sequence. For example, the primary PMIC may trigger the secondary PMICs to perform their respective deep sleep sequences and receive confirmation of the completion of the deep sleep sequences from the secondary PMICs. The deep sleep completion notification may be sent based on receiving completion indications from all of the other secondary PMICS.

The SoC 500 includes similar subsystems and components described with reference to the SoCs of FIGS. 2-4. For example, the SoC 500 includes a primary chiplet 512, a secondary chiplet 514, a deep sleep controller 522, a primary PMIC 532, and a secondary PMIC 534.

The primary chiplet 512 and the secondary chiplet 514 include or correspond to a same type of chiplet and have a similar design with similar components. For example, the primary chiplet 512 and the secondary chiplet 514 may have the same subsystems and IPs. In some implementations, the chiplets have identical configurations and/or layouts. The primary chiplet 512 and the secondary chiplet 514 each have a DDR memory and may be configured to operate the memories independently of one another or in coordination with one another, such as in an ICHI configuration.

The primary chiplet 512 and the secondary chiplet 514 may include or correspond to any of the chiplets described with reference to FIGS. 2-4. For example, the primary chiplet 512 and the secondary chiplet 514 may each include one or more of the components of the chiplets described above reference to FIGS. 2-4. The deep sleep controller 522 includes or corresponds to circuitry configured to control enhanced deep sleep operations for chiplets of the SoC 500. The deep sleep controller 522 may include or correspond to a single component or device, such as a single circuit component or IC, or to multiple circuit components or devices of the SoC 500. In some such implementations where the deep sleep controller 522 correspond to multiple components, the deep sleep controller 522 may be distributed across multiple chiplets or dies, that is have a component or components on multiple chiplets or dies.

The deep sleep controller 522 may include or correspond to an Electrically Independent Module (EIM), a microcontroller unit (MCU), the primary of secondary AOSS (first AOSS 342 or second AOSS 352), of FIG. 3, or the APSS 422 of FIG. 4. Additionally, or alternatively, the deep sleep controller 522 may include or correspond to one or more of the deep sleep logic of FIG. 2, such as one or more of the DDR AUX 214, the ARC 216, or the AOSS sleep hardening logic 220.

The deep sleep controller 522 is configured to determine whether or not to transition to the deep sleep mode, and to signal or provide an indication of a determination to transition to the deep sleep mode. For example, the deep sleep controller 522 may provide the indication to transition to the deep sleep mode to one or more chiplets. To illustrate, the deep sleep controller 522 may provide multiple indications, such as one to each chiplet, or may provide a single indication to a master chiplet which is then relayed or distributed to the other chiplets.

The deep sleep controller 522 may determine to enter the deep sleep mode based on one or more conditions corresponding to resources of the SoC 500. For example, the deep sleep controller 522 may receive resource usage information from the chiplets (e.g., components thereof) and compare the resource information to corresponding resource thresholds. Additionally, or alternatively, the deep sleep controller 522 may receive vote information from the chiplets (e.g., components thereof) and compare the vote information to corresponding vote thresholds.

The primary PMIC 532 and the secondary PMIC 534 may each include or correspond to any of the PMICs described with reference to FIGS. 2-4. For example, the primary PMIC 532 and the secondary PMIC 534 may include or correspond to the PMIC 222 of FIG. 2, the primary PMIC 332 or the secondary PMIC 334 of FIG. 3, or any of the PMICs 432 of FIG. 4.

The primary PMIC 532 and the secondary PMIC 534 may each include or correspond to circuitry configured to control power delivery throughout the SoC 500. The PMICs are configured to provide power to clients and components of the SoC 500 and to implement power states of the SoC 500. For example, the PMICs are configured to control operation of one or more power rails of the SoC 500, such a logic power rail, a memory power rail, a crystal oscillator power rail, etc., and control of the power rails may include switching between configurations of the power rails of the SoC 500 and/or of circuitry of the PMICs, which may be associated with particular power modes, such as on, low power, sleep, deep sleep, etc.

The primary PMIC 532 and the secondary PMIC 534 may each include a deep sleep programable boot sequence (DS PBS). The DS PBS may include or correspond to a logical sequence or series of steps for collapsing power rails and transitioning the SoC 500 to the deep sleep state. The PMICs, such as the DS PBS thereof, may be triggered by the chiplets or by the deep sleep controller 522.

During operation, the deep sleep controller 522 receives vote and/or resource information from the chiplets relating to components of the chiplets, such as clients and DDR memories thereof. The deep sleep controller 522 determines to transition to the deep sleep mode based on a determination that the vote and/or resource information satisfy corresponding thresholds. The deep sleep controller 522 sends a deep sleep initiation message or indication to the primary chiplet (deep sleep trigger) to initiate or trigger deep sleep and further deep sleep entry operations.

The primary chiplet 512 may perform deep sleep initiation operations and prepare or harden its components for sleep. Additionally, the primary chiplet 512 coordinates with the other chiplets for deep sleep. For example, the primary chiplet sends a deep sleep initiation or coordination message to the secondary chip 415 to initiate or trigger deep sleep entry operations for the secondary chiplet 514.

The primary chiplet 512 sends a deep sleep sequence trigger message or indication to the primary PMIC 532 to trigger a DS PBS and transition the SoC 500 to the deep sleep state. The primary PMIC 532 coordinates with other PMICs, such as the secondary PMIC 534 and performs its DS PBS. For example, the primary PMIC 532 sends a message to trigger a DS PBS of the secondary PMIC 534. The primary PMIC 532 and the secondary PMIC 534 may perform their respective DS PBS and collapse the power rails of the SoC 500 to transition the SoC 500 to the deep sleep mode. After completion of the deep sleep transition sequence, the primary PMIC 532 may indicate deep sleep sequence completion and that the SoC 500 is in the deep sleep state to the deep sleep controller 522.

Although the example of FIG. 5 depicts a multiple PMIC configuration with dedicated PMICs for each chiplet, in other implementations, the SoC 500 may have a single PMIC or may have multiple PMICs which control multiple chiplets of the SoC 500.

Figure 6:
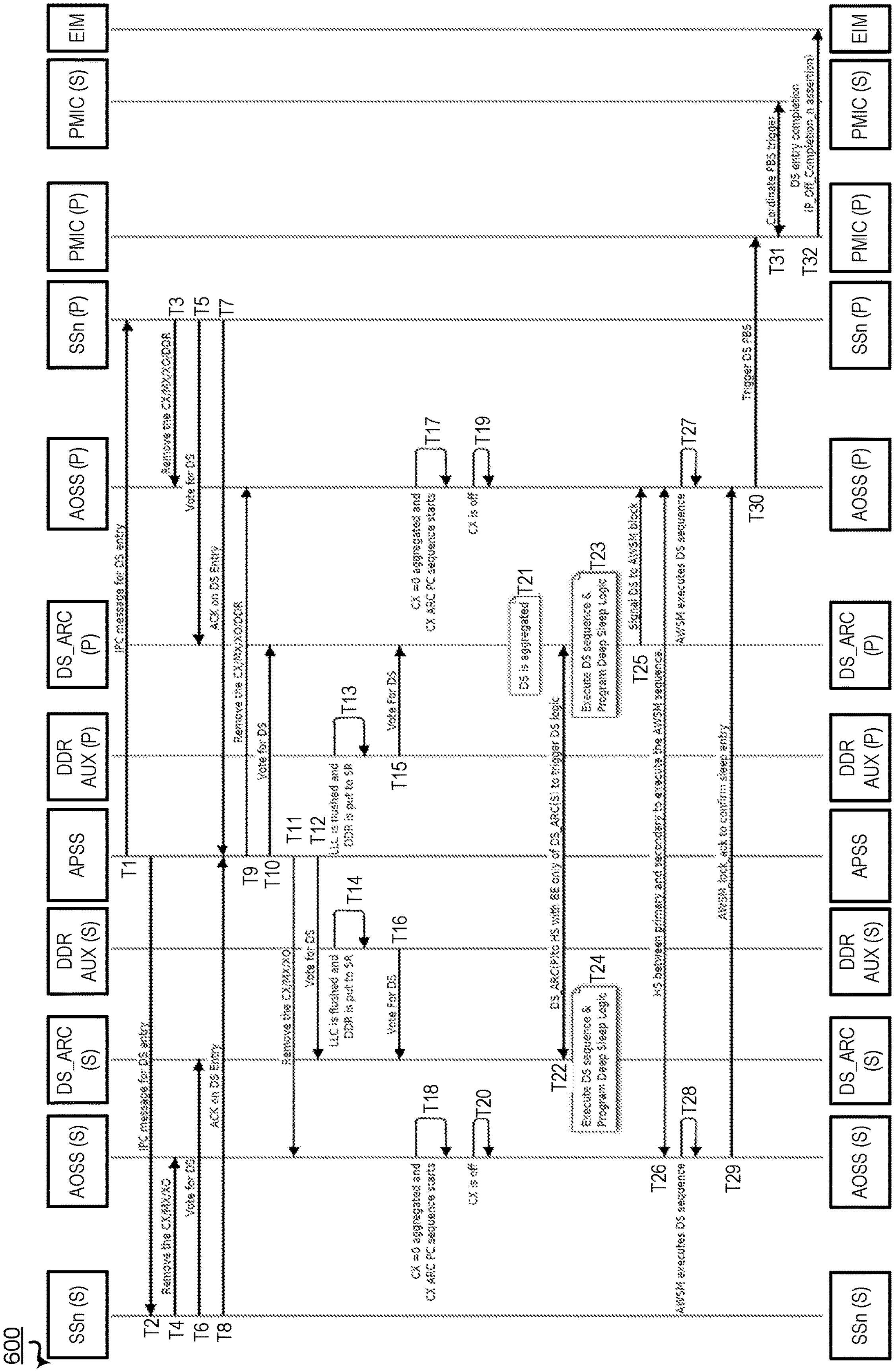
FIG. 6 is a flow diagram illustrating an example of enhanced deep sleep operations for multiple chip SoCs according to some aspects of the disclosure.

Referring to FIG. 6, FIG. 6 is a flow diagram 600 of an example of enhanced deep sleep operations for a multiple chip SoC architecture with homogenous chiplets. In FIG. 6, the enhanced deep sleep operations may be performed by any of the SoCs of FIGS. 3-5. FIG. 6 depicts an example of details enhanced deep sleep operations for multiple chip SoC architecture with homogenous chiplets.

In the example of FIG. 6, the SoC includes two dies a primary die and a secondary die. Each die corresponds to a particular chiplet, such as primary chiplet and a secondary chiplet. The SoC includes an APSS, an EIM, multiple subsystems, multiple DDR AUXs, multiple deep sleep entities (e.g., DS ARCs and AOSSs), multiple PMICs, The primary die/chiplet includes primary subsystems (SSn(P)), a primary AOSS, and a primary DS ARC, and may be associated with a primary PMIC. The secondary die/chiplet includes secondary subsystems (SSn(S)), a secondary AOSS, and a secondary DS ARC, and may be associated with a secondary PMIC. One or more of the APSS, the EIM, or the PMICs may be separate from the die/chiplets in some implementations. In other implementations, one or more of the APSS, the EIM, or the PMICs may be on die or chiplet, such as the primary chiplet for the APSS and/or the EIM, or a corresponding die for the PMICs.

The components of the SoC may include or correspond to one or more components of FIGS. 2-5. For example, the primary die/chiplet may include or correspond to the primary chiplet 312 or the secondary chiplet 314 of FIG. 3, the primary die 412 or the secondary die 414 of FIG. 4, or the primary chiplet 512 or the secondary chiplet 514 of FIG. 5. The primary subsystems may include or correspond to the first subsystems 344 or the second subsystems 354.

The primary AOSS may include or correspond to the AOSS sleep hardening logic 220 or the deep sleep enable logic 218 of FIG. 2 or the first AOSS 342 or the second AOSS 352 of FIG. 3. The primary DS ARC may include or correspond to the ARC 216 or the deep sleep entity 242 of FIG. 2. The primary PMIC may include or correspond to one or more of the primary PMIC 332 or the secondary PMIC 334 of FIG. 3, the PMICs 432 of FIG. 4, or the primary PMIC 532 or the secondary PMIC 534 of FIG. 5.

The secondary die/chiplet may include or correspond to the primary chiplet 312 or the secondary chiplet 314 of FIG. 3, the primary die 412 or the secondary die 414 of FIG. 4, or the primary chiplet 512 or the secondary chiplet 514 of FIG. 5.

The secondary subsystems may include or correspond to the first subsystems 344 or the second subsystems 354. The secondary AOSS may include or correspond to the AOSS sleep hardening logic 220 or the deep sleep enable logic 218 of FIG. 2 or the first AOSS 342 or the second AOSS 352 of FIG. 3. The secondary DS ARC may include or correspond to the ARC 216 or the deep sleep entity 242 of FIG. 2.

The secondary PMIC may include or correspond to one or more of the primary PMIC 332 or the secondary PMIC 334 of FIG. 3, the PMICs 432 of FIG. 4, or the primary PMIC 532 or the secondary PMIC 534 of FIG. 5. The APSS may include or correspond to the APSS 422 of FIG. 4. The EIM may include or correspond to the DS controller of 522 of FIG. 5.

During operation of the SoC, at T1, the APSS sends IPC messages the primary subsystems (SSn(P)) of the primary chiplet/die for deep sleep entry responsive to a determination to enter the deep sleep mode. For example, the APSS may send one or more IPC messages to communicate with subsystems of the primary subsystems (SSn(P)) to indicate that the APSS has determined a trigger (e.g., one or more conditions are satisfied) to enter the deep sleep state.

At T2, the APSS sends IPC messages the secondary subsystems (SSn(S)) of the secondary chiplet/die for deep sleep entry responsive to the determination to enter the deep sleep mode. For example, the APSS may send one or more IPC messages to communicate with subsystems of the secondary subsystems (SSn(s)) to indicate that the APSS has determined a trigger (e.g., one or more conditions are satisfied) to enter the deep sleep state.

Deep sleep entry for the SoC may be determined by the EIM or by the APSS based one or more conditions depending on the type of the SoC. For example, in the case of auto, deep sleep is entered based on a duration of parking, location, garage mode, etc. The EIM may notify the APSS of that the condition(s) for deep sleep have been satisfied so that the APSS can trigger the subsystems as T1 and T2.

At T3, the primary subsystems (SSn(P)) of the primary chiplet/die send a message or indication to the primary AOSS (AOSS (P)) of the primary chiplet/die to remove themselves from their respective power rail, such as CX, MX or XO rails. For example, the subsystems of the primary subsystems (SSn(P)) send a message to the primary AOSS (AOSS (P)) to indicate that they are ready to begin transition to the deep sleep state and to be removed from their respective power rail. As a part of the deep sleep entry, the primary subsystems terminate their task execution and remove the votes on resources like logic and memory power rails and DDR bandwidth.

At T4, the secondary subsystems (SSn(S)) of the secondary chiplet/die send a message or indication to the secondary AOSS (AOSS (S)) of the secondary chiplet/die to remove themselves from their respective power rail, such as CX, MX or XO rails. For example, the subsystems of the secondary subsystems (SSn(S)) send a message to the secondary AOSS (AOSS (S)) to indicate that they are ready to begin transition to the deep sleep state and to be removed from their respective power rail. As a part of the deep sleep entry, the secondary subsystems terminate their task execution and remove the votes on resources like logic and memory power rails and DDR bandwidth.

At T5, the primary subsystems (SSn(P)) of the primary chiplet/die send a vote message or vote indication to the primary DS ARC (DS ARC (P)) of the primary chiplet/die to vote for deep sleep or indicate deep sleep ready. For example, the subsystems of the primary subsystems (SSn (P)) send a vote indication message to the primary DS ARC (DS ARC (P)) to indicate a vote for deep sleep.

At T6, the secondary subsystems (SSn(S)) of the secondary chiplet/die send a vote message or vote indication to the secondary DS ARC (DS ARC (S)) of the secondary chiplet/die to vote for deep sleep or indicate deep sleep ready. For example, the subsystems of the secondary subsystems (SSn (S)) send a vote indication message to the secondary DS ARC (DS ARC (S)) to indicate a vote for deep sleep.

At T7, the primary subsystems (SSn(P)) of the primary chiplet/die send an acknowledgement message or indication (e.g., an ACK) to the APSS to acknowledge deep sleep entry or deep sleep ready. For example, the subsystems of the primary subsystems (SSn(P)) send an acknowledgement message to the APSS to acknowledge the deep sleep trigger received from the APSS and to indicate that the subsystem has voted for deep sleep to the DS ARC and is ready for deep sleep transition (e.g., has triggered removal from a corresponding power rail). In some implementations, the ACK is sent responsive to sending the vote indication to the DS ARC or to receiving a confirmation message from the DS ARC that is in response to the vote indication.

At T8, the secondary subsystems (SSn(S)) of the secondary chiplet/die send an acknowledgement message or indication (e.g., an ACK) to the APSS to acknowledge deep sleep entry or deep sleep ready. For example, the subsystems of the secondary subsystems (SSn(s)) send an acknowledgement message to the APSS to acknowledge the deep sleep trigger received from the APSS and to indicate that the subsystem has voted for deep sleep to the DS ARC and is ready for deep sleep transition (e.g., has triggered removal from a corresponding power rail). In some implementations, the ACK is sent responsive to sending the vote indication to the DS ARC or to receiving a confirmation message from the DS ARC that is in response to the vote indication.

Once the APSS receives the acknowledgements (ACKs) from all the subsystems of the SoC, the APSS would be the last entity remaining active (e.g., the last subsystem remaining active). After receiving the acknowledgements, the APSS may enter its low power mode and removes votes on its resources, such as logic and memory power rails and DDR bandwidth, and vote for deep sleep to the DS ARCs of the SoC.

At T9, the APSS sends a message or indication to the primary AOSS (AOSS (P)) of the primary chiplet/die to remove votes on its resources. For example, after the APSS has carried out its deep sleep triggering of the subsystems of the SoC (which utilize the APSS) and has received acknowledgements from the subsystems of the SoC, the APSS may send an indication to the primary AOSS to trigger removal of the vote for resources for the APSS. The resources of the APSS include its respective power rails and DDR resources, such as CX, MX or XO power rails and DDR bandwidth.

At T10, the APSS sends a vote message or vote indication to the primary DS ARC (DS ARC (P)) of the primary chiplet/die to vote for deep sleep or indicate deep sleep ready. For example, the APSS sends a vote message or vote indication to the primary DS ARC of the primary chiplet/die to vote for deep sleep or indicate deep sleep ready responsive to removal of votes on APSS resources.

At T11, the APSS sends a message or indication to the secondary AOSS (AOSS (S)) of the secondary chiplet/die to votes on its resources. For example, after the APSS has carried out its deep sleep triggering of the subsystems of the SoC (which utilize the APSS) and has received acknowledgements from the subsystems of the SoC, the APSS may send an indication to the secondary AOSS to trigger removal of the vote for resources for the APSS. The resources of the APSS include its respective power rails and DDR resources, such as CX, MX or XO power rails and DDR bandwidth.

At T12, the APSS sends a vote message or vote indication to the secondary DS ARC (DS ARC (S)) of the secondary chiplet/die to vote for deep sleep or indicate deep sleep ready. For example, the APSS sends a vote message or vote indication to the secondary DS ARC of the secondary chiplet/die to vote for deep sleep or indicate deep sleep ready responsive to removal of votes on APSS resources.

Once zero DDR bandwidth is aggregated by the above removal of votes and resources, both the primary and secondary DDR AUX may collapse a LLC of their respective DDR memories and put their respective DDR memories into a self-refresh mode (e.g., MX rail reduced to retention, at least temporarily).

At T13, the primary DDR AUX (DDR AUX (P)) of the primary chiplet/die flushes a LLC of a primary DDR memory of the primary chiplet/die and puts the primary DDR memory into a self-refresh state. In some implementations, the primary DDR AUX may only flush the LLC and transition the primary DDR memory to the self-refresh state responsive to a determination that DDR bandwidth resources of the primary DDR memory have been cleared and/or that active DDR bandwidth of the primary DDR memory is zero.

At T14, the secondary DDR AUX (DDR AUX(S)) of the secondary chiplet/die flushes a LLC of a secondary DDR memory of the secondary chiplet/die and puts the secondary DDR memory into a self-refresh state. In some implementations, the secondary DDR AUX may only flush the LLC and transition the secondary DDR memory to the self-refresh state responsive to a determination that DDR bandwidth resources of the secondary DDR memory have been cleared and/or that active DDR bandwidth of the secondary DDR memory is zero.

At T15, the primary DDR AUX (DDR AUX (P)) of the primary chiplet/die sends a vote message or vote indication to the primary DS ARC (DS ARC (P)) of the primary chiplet/die to vote for deep sleep or indicate deep sleep ready. In some implementations, the primary DDR AUX only votes to allow deep sleep after it has transitioned the primary DDR memory into a low-power mode, such as self-refresh mode.

At T16, the secondary DDR AUX (DDR AUX(S)) of the secondary chiplet/die sends a vote message or vote indication to the secondary DS ARC (DS ARC (S)) of the secondary chiplet/die to vote for deep sleep or indicate deep sleep ready. In some implementations, the secondary DDR AUX only votes to allow deep sleep after it has transitioned the secondary DDR memory into a low-power mode, such as self-refresh mode.

After the DDR memories of the SoC have been transitioned into a low power mode, such as a self-refresh mode, and an indication that the DDR memories are in the low power mode (e.g., a vote for deep sleep from the DDR AUX)

has been received by the AOSSs of the SoC, the AOSSs of the SoC may clear and/or aggregated resources for deep sleep aggregation.

At T17, the primary AOSS (AOSS (P)) of the primary chiplet/die clears the aggregated logic rail resource(s) and/or votes, and starts a logic rail ARC PC sequence. At T18, the secondary AOSS (AOSS (S)) of the secondary chiplet/die clears the aggregated logic rail resource(s) and/or votes, and starts a logic rail ARC PC sequence.

At T19, the primary AOSS (AOSS (P)) of the primary chiplet/die powers off the logic rail or removes itself from the logic rail (CX rail). At T20, the secondary AOSS (AOSS (S)) of the secondary chiplet/die powers off the logic rail or removes itself from the logic rail (CX rail).

The primary chiplet may trigger the deep sleep logic (e.g., DS ARCs and AOSS) once the deep sleep state is determined based on aggregated resources and/or votes and after the AOSSs of the SoC have performed the operations at T17-T20.

At T21, the primary DS ARC (DS ARC (P)) of the primary chiplet/die aggregates a deep sleep state or resources. For example, the primary DS ARC stores and aggregates the received deep sleep state votes or deep sleep state resources from the vote indications or messages from the primary subsystems and the primary DDR AUX, and from the secondary AOSS, which stores and aggregates the received deep sleep state votes or deep sleep state resources from the vote indications or messages from the secondary subsystems and the secondary DDR AUX. To illustrate, the DS ARC determines to perform a deep sleep branch event based on the DDR AUXs and subsystems voting for deep sleep and clearing resources.

At T22, the primary DS ARC (DS ARC (P)) of the primary chiplet/die and the secondary DS ARC (DS ARC (S)) of the secondary chiplet/die coordinate (e.g., communicate) to trigger deep sleep logic. For example, the primary DS ARC and the secondary DS ARC communicate with each other across the control plane via the D2D interface to coordinate triggering of the deep sleep logic for the chiplets of the SoC. To illustrate, the primary DS ARC determines whether to trigger further deep sleep operations and logic based on the deep sleep information received from the secondary DS ARC, and responsive to determining to trigger further deep sleep operations and logic based on the deep sleep information received from the secondary DS ARC, the primary DS ARC sends a deep sleep trigger across the control plane via the D2D interface to indicate to the secondary DS ARC of the secondary chiplet/die to trigger execution of the deep sleep sequence. In some implementations, the primary DS ARC coordinates with a Backend Only DS entity on the secondary chiplet (e.g., of the secondary DS ARC) to trigger deep sleep logic on the secondary chiplet.

At T23, the primary DS ARC (DS ARC (P)) of the primary chiplet/die executes a deep sleep sequence and programs deep sleep logic for deep sleep operations. For example, the primary DS ARC executes a deep sleep sequence and programs deep sleep logic for deep sleep operations responsive to sending the deep sleep trigger to the secondary DS ARC. In some implementations, the deep sleep sequence includes asserting a DS branch event to the AWSM of the primary AOSS. The AWSM may be triggered when all clients, RPMH, etc. are idle, similar to a RBS mode.

At T24, the secondary DS ARC (DS ARC (S)) of the secondary chiplet/die executes a deep sleep sequence and programs deep sleep logic for deep sleep operations. For example, the secondary DS ARC executes a deep sleep sequence and programs deep sleep logic for deep sleep operations responsive to receiving the deep sleep trigger from the primary DS ARC. In some implementations, the deep sleep sequence includes asserting a DS branch event to the AWSM of the secondary AOSS. The AWSM may be triggered when all clients, RPMH, etc. are idle, similar to a RBS mode.

At T25, the primary DS ARC (DS ARC (P)) of the primary chiplet/die sends a trigger signal to the primary AOSS (AOSS (P)), such as an AWSM thereof, to coordinate execution of deep sleep sequences across the SoC. For example, the primary DS ARC sends a trigger indication to the primary AOSS to coordinate execution of the deep sleep sequences for the chiplets of the SoC. In some implementations, the primary DS ARC asserts a DS branch event to the AWSM of the primary AOSS.

At T26, the primary AOSS (AOSS (P)) of the primary chiplet/die and the secondary AOSS (AOSS (S)) of the secondary chiplet/die communicate with each other (e.g., coordinate) to trigger execution of the deep sleep sequences. For example, the primary AOSS and the secondary AOSS communicate with each other across the control plane via the D2D interface to coordinate performance of the deep sleep sequences for the chiplets of the SoC based on and responsive to receiving the trigger indication from the primary DS ARC. The coordination with the secondary AOSS may be part of a DS specific sequence triggered by the received DS branch event indication.

At T27, the primary AOSS (AOSS (P)) of the primary chiplet/die, such as an AWSM thereof, executes the deep sleep sequence. For example, the AWSM of the primary AOSS executes the deep sleep sequence for the primary chiplet/die. To illustrate, the AWSM of the primary AOSS may perform sleep hardening operations for the components of the primary chiplet/die. The deep sleep sequence may include or correspond to a DS specific sequence, and resource voting, which also triggers a DS PBS of primary or corresponding PMIC, as opposed to a sleep sequence for RBS.

At T28, the secondary AOSS (AOSS (S)) of the secondary chiplet/die, such as an AWSM thereof, executes the deep sleep sequence. For example, the AWSM of the secondary AOSS executes the deep sleep sequence for the secondary chiplet/die. To illustrate, the AWSM of the secondary AOSS may perform sleep hardening operations for the components of the secondary chiplet/die. The deep sleep sequence may include or correspond to a DS specific sequence, and resource voting, which also triggers a DS PBS of primary or corresponding PMIC, as opposed to a sleep sequence for RBS. At T29, the primary AOSS (AOSS (P)) of the primary chiplet/die and the secondary AOSS (AOSS (S)) of the secondary chiplet/die communicate with each other (e.g., coordinate) to confirm performance of the deep sleep sequences. For example, the primary AOSS and the secondary AOSS communicate with each other across the control plane via the D2D interface to confirm completion of the execution of the deep sleep sequences for the chiplets of the SoC. To illustrate, the secondary AOSS sends a completion assertion message to the primary AOSS responsive to completion of the deep sleep transition sequence.

At T30, the primary AOSS (AOSS (P)) of the primary chiplet/die sends a trigger message or indication to the primary PMIC (PMIC (P)) to trigger a PBS of primary PMIC (PMIC (P)). For example, the primary AOSS (or AWSM block thereof) sends a trigger to the primary PMIC to perform PBS operations for at least the primary chiplet/ die. The PBS operations of the primary PMIC may include PBS operations for the primary chiplet/die directly and indirectly for one or more of the other dies of the SoC. For example, the PBS operations of the primary PMIC may power rail control operations, such as power rail collapse operations, for the primary chiplet/die. As another example, the PBS operations of the primary PMIC may include PMIC coordination operations and PMIC PBS triggering operations for other PMICs of SoC. In some such implementations, the primary AOSS trigger the PBS operations by the primary PMIC towards an end of the deep sleep entry flow.

At T31, the primary PMIC (PMIC (P)) optionally coordinates with any non-primary PMICs, such as the secondary PMIC (PMIC (S)) for the secondary chiplet/die, to trigger a PBS of the non-primary PMICs. For example, the primary PMIC sends a trigger to the secondary PMIC to perform PBS operations for the secondary chiplet/die. The PBS operations of the secondary PMIC may be different from or the same as the PBS operations of the primary PMIC. In some such implementations, as a part of PBS sequence the primary PMIC triggers PBS operations by the secondary PMICs by asserting DS_EN to the secondary PMICs.

Additionally, the primary PMIC and the secondary PMIC may send additional message back and forth to synchronize/coordinate the PBS operations for the different dies/chiplets. For example, after a non-primary PMIC completes its PBS execution, non-primary PMIC may send an acknowledgement message or indication (e.g., an ACK or P_Off_Complete_n) to the primary PMIC for PBS completion on the non-primary PMIC.

At T32, the primary PMIC (PMIC (P)) sends deep sleep entry completion message to the EIM. For example, the primary PMIC sends a completion assertion message to the EIM responsive to receiving the acknowledgment message from the other PMICs, non-primary or secondary PMICs, and to indicate completion of the deep sleep transition process and to indicate completion of entry to the deep sleep mode. Additionally, or alternatively, the primary PMIC sends the completion assertion message to the EIM responsive to completing its PBS operations.

The above operations may be broken into three stages for reference and general categorization. Stage 1 may correspond to a Deep Sleep Trigger and Subsystem notification stage, Stage 2 may correspond to a DDR collapse and AWSM sequence execution stage, and Stage 3 may correspond a PMIC PBS trigger and coordination stage. Stage 1 operations may include the operations described with reference to T1-T12, Stage 2 operations may include the operations described with reference to T12-T29, and Stage 3 operations may include the operations described with reference to T30-T32.

Figure 7:
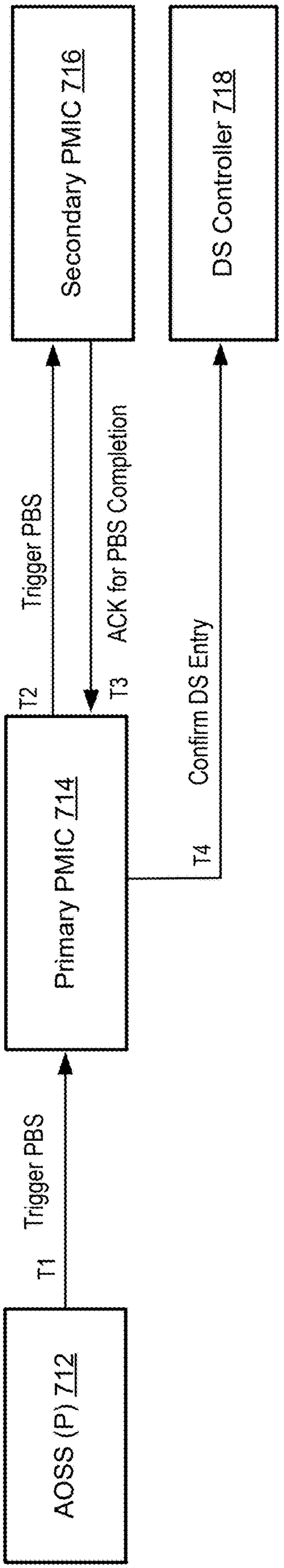
FIG. 7 is a block diagram illustrating an example of enhanced deep sleep operations for multiple chip SoCs according to some aspects of the disclosure.
Figure 8:
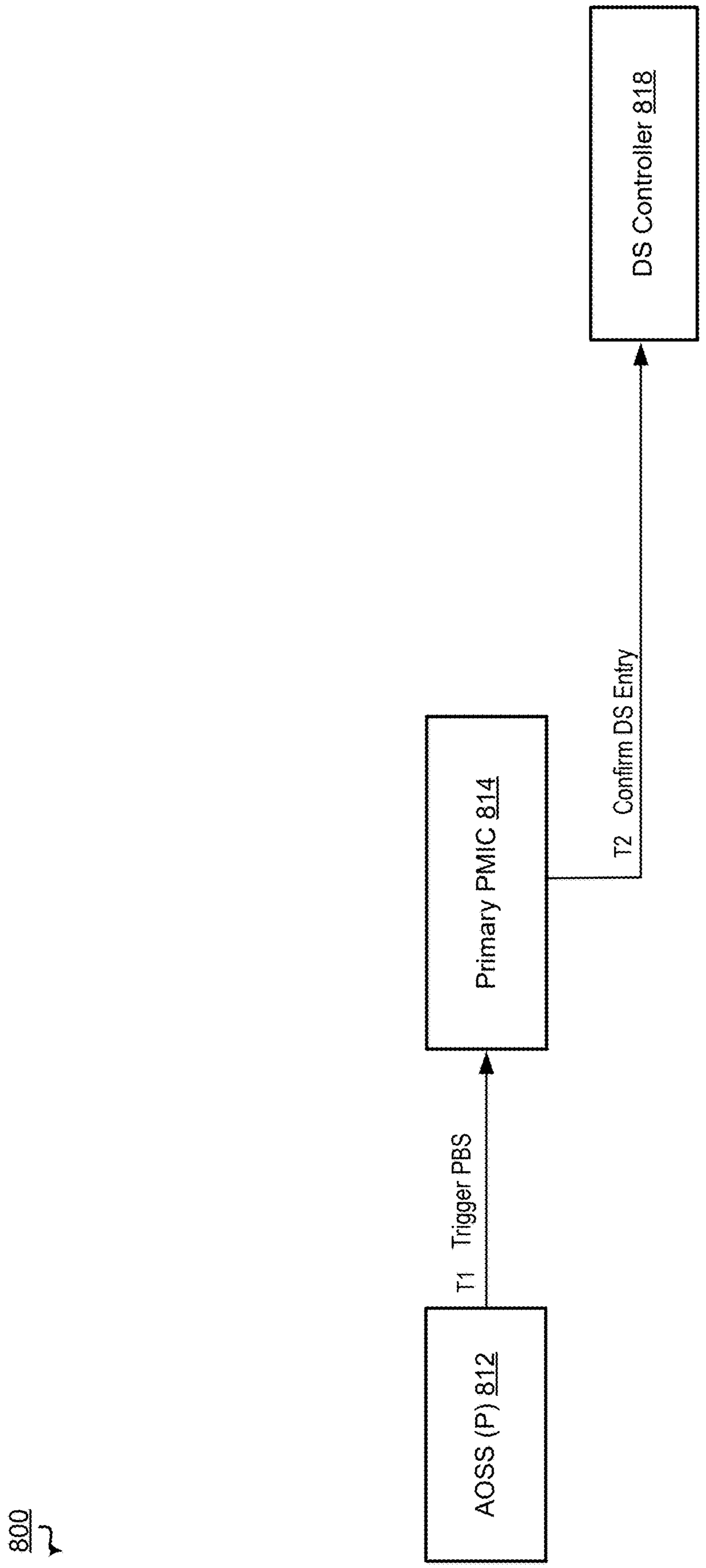
FIG. 8 is a block diagram illustrating an example of enhanced deep sleep operations for multiple chip SoCs according to some aspects of the disclosure.

FIGS. 7 and 8 may corresponds to different examples of detailed PMIC PBS trigger and coordination operations for the examples enhanced deep sleep operations of FIG. 6. The components of the SoCs of FIGS. 7 and 8 may include or correspond to one or more components of FIGS. 2-6. For example, the AOSS 712, 812 may include or correspond to the AOSS sleep hardening logic 220 or the deep sleep enable logic 218 of FIG. 2, the first AOSS 342 or the second AOSS 352 of FIG. 3, or the primary AOSS or the secondary AOSS of FIG. 6. The primary PMIC 714, 814 may include or correspond to one or more of the primary PMIC 332 or the secondary PMIC 334 of FIG. 3, the PMICs 432 of FIG. 4, the primary PMIC 532 or the secondary PMIC 534 of FIG. 5, or the primary PMIC or the secondary PMIC of FIG. 6. The secondary PMIC 716, 816 may include or correspond to one or more of the primary PMIC 332 or the secondary PMIC 334 of FIG. 3, the PMICs 432 of FIG. 4, the primary PMIC 532 or the secondary PMIC 534 of FIG. 5, or the primary PMIC or the secondary PMIC of FIG. 6. The DS Controller 718, 818 may include or correspond to the APSS 422 of FIG. 4, the DS controller of 522 of FIG. 5, or the EIM of FIG. 6.

Referring to FIG. 7, FIG. 7 a block diagram of an example of a multiple chip SoC architecture with homogenous chiplets. In FIG. 7, a SoC 700 that is configured for enhanced deep sleep operations is illustrated. FIG. 7 depicts an example PMIC trigger sequence of enhanced deep sleep operations for multiple chip SoC architecture with homogenous chiplets.

The SoC 700 includes a AOSS 712, a primary PMIC 714, a secondary PMIC 716, and a DS Controller 718. During operation, at T1, the AOSS 712 on the primary die triggers the PBS operations on the primary PMIC 714. The PBS triggering at T1 may occur during Stage 3 and towards the end of deep sleep entry flow. The AOSS 712 for deep sleep (or AWSM block thereof) may only interact with the primary PMIC 714 to trigger the PBS (and the operations thereof).

At T2, as a part of PBS sequence, the primary PMIC 714 triggers the PBS operations on the secondary PMICs, such as the secondary PMIC 716.

At T3, after the non-primary PMIC(s) complete(s) execution of the PBS operations, the non-primary PMIC(s), such as the secondary PMIC 716, send(s) an acknowledgment message to primary PMIC 714 for PBS completion on the non-primary PMIC(s).

At T4, after receiving the acknowledgment messages (e.g., ACKs) from all non-primary PMICs, the primary PMIC 714 confirms deep sleep entry to the DS Controller 718 (e.g., a EIM or MCU) to indicate completion of the deep sleep entry and that the SoC is in the deep sleep state.

Referring to FIG. 8, FIG. 8 a block diagram of an example of a multiple chip SoC architecture with homogenous chiplets. In FIG. 8, a SoC 800 that is configured for enhanced deep sleep operations is illustrated. FIG. 8 depicts an example PMIC trigger sequence of enhanced deep sleep operations for multiple chip SoC architecture with homogenous chiplets.

The SoC 800 includes a AOSS 812, a primary PMIC 814, and a DS Controller 818. During operation, at T1, the AOSS 812 on the primary die triggers the PBS operations on the primary PMIC 814. The PBS triggering at T1 may occur during Stage 3 and towards the end of deep sleep entry flow. The primary PMIC 814 performs its PBS operations and completes its PBS. The AOSS 812 for deep sleep (or AWSM block thereof) may only interact with the primary PMIC 814 to trigger the PBS (and the operations thereof).

At T2, the primary PMIC 814 confirms deep sleep entry to the DS Controller 818 (e.g., a EIM or MCU) to indicate completion of the deep sleep entry based on and responsive to completion of the PBS by the primary PMIC 814.

The aspects described herein provide innovative designs and methods for sequential entry for deep sleep state for chiplets which enhances debugging capabilities. The aspects described herein further provide a novel method of voting to enter a deep sleep state to a DS_ARC by all subsystems and a DDR_AUX. The aspects described herein further provide a deep sleep logic trigger for programming on the secondary or non-primary chiplets via a primary chiplet, and provide for deep Sleep PBS trigger and execution among the multiple PMICs powering different chiplets.

Figure 9:
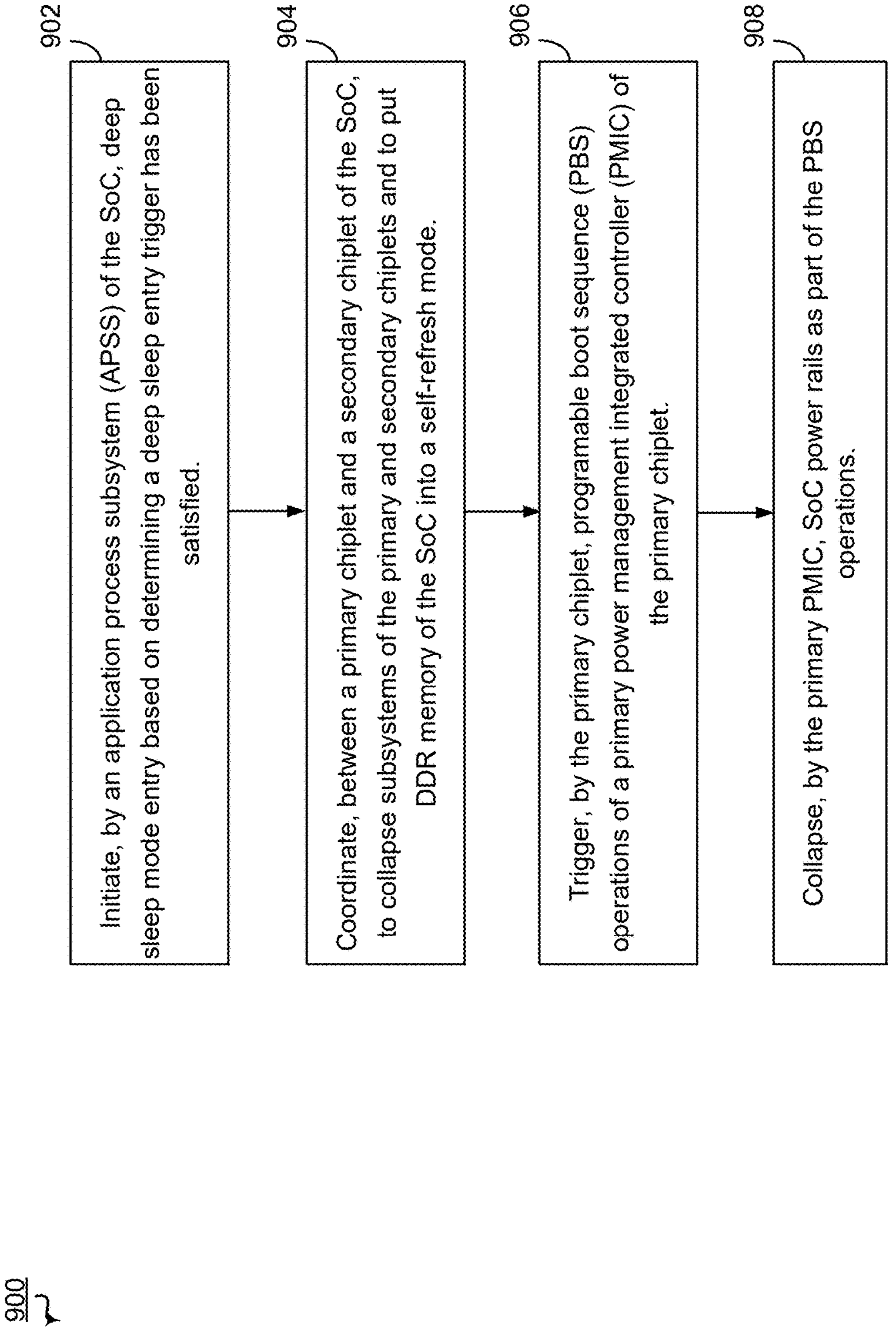
FIG. 9 is a flow chart illustrating an example of enhanced deep sleep operations for multiple chip SoCs according to some aspects of the disclosure.

Referring to FIG. 9, FIG. 9 is a flow chart illustrating a method 900 for enhanced deep sleep operations for multiple chip SoCs according to some embodiments of the disclosure. In some implementations, the method may be performed by any of the SoCs, and components thereof, of FIGS. 2-8. For example, the components of the SoCs of FIGS. 2-8 may perform enhanced deep sleep operations.

The method 900 includes, at block 902, initiating, by an application processor subsystem (APSS) of the SoC, deep sleep mode entry based on determining a deep sleep entry trigger has been satisfied. For example, the APSS initiates deep sleep mode entry based on determining that a deep sleep entry trigger has been satisfied, as described with reference to FIGS. 4-8. To illustrate, the APSS sends message for deep sleep entry at T1 and/or T2 to subsystems of the SoC, as described with reference to FIG. 6. As another illustration, the APSS votes for deep sleep entry at T10 and/or T12 and sends messages to DS_ARCs of the SoC, as described with reference to FIG. 6.

The APSS may include or correspond to the APSS 422 of FIG. 4, the DS controller 522 of FIG. 5, the APSS of FIG. 6, the AOSS 712 of FIG. 7, or the AOSS 812 of FIG. 8. The deep sleep mode may include or correspond to a deep sleep mode or state as described herein, such as a deep sleep mode which is lower or deeper than a RBS sleep mode and has a quick boot wakeup ability and DDR memory retention. The deep sleep mode entry may include or correspond to initial deep sleep mode transition operations to put DDR memory into a self-refresh state and removes subsystems from power rails. The deep sleep entry trigger may include or correspond to a determination that DDR memory (e.g., a DDR AUX associated therewith) has voted for or is able to transition to a self-refresh state and that subsystems of the SoC have voted for or are able to be removed from power rails.

At block 904, the method 900 includes coordinating, between a primary chiplet and a secondary chiplet of the SoC, to collapse subsystems of the primary and secondary chiplets and to put DDR memory of the SoC into a self-refresh mode. For example, the DS ARCs of the chiplets of the SoC may communicate with each other to perform deep sleep transition operations and collapse subsystems of the chiplets, as described with reference to FIGS. 2-8. To illustrate, the primary DS ARC and the secondary DS ARC communicate with each other at T22 and execute their deep sleep sequences and program deep sleep logic at T23 and T24, as described with reference to FIG. 6.

The primary and second chiplets may each include or correspond to the primary chiplet 312 or the secondary chiplet 313 of FIG. 3, the primary die 412 or the secondary die 414 of FIG. 4, the primary chiplet 512 or the secondary chiplet 514 of FIG. 5, or the primary and second chiplets of FIG. 6. The subsystems may include or correspond to the clients 212 of FIG. 2, the first subsystems 344 or the second subsystems 354 of FIG. 3, or the primary subsystems (SSn (P)) or the secondary subsystems (SSn (S)) of FIG. 6. The DDR memory may include or correspond to the primary DDR memory 322 or the secondary DDR memory 324 of FIG. 3 or the DDR memories of the corresponding chiplets or dies. The self-refresh mode may include or correspond to self-retention state where DDR memory information is retained without power being suppled to the DDR memory.

At block 906, the method 900 includes triggering, by the primary chiplet, programable boot sequence (PBS) operations of a primary power management integrated controller (PMIC) of the primary chiplet. For example, the DS controller 522, the AOSS 712, or the AOSS 812 (e.g., the AWSM thereof), sends a message to a primary or master PMIC to initiate PBS operations of the primary PMIC of the primary chiplet, as described with reference to FIGS. 5-8. To illustrate, the AOSS (P) triggers DS PBS of the primary PMIC (PMIC (P) at T30 responsive to receiving an indication of AWSM sequence completion from other AOSSs (e.g., AOSS (S)), as described with reference to FIG. 6.

The PBS operations may include or correspond to operations of a PBS sequence of one or more PMICs of the SoC, such as DS PBS 262 of FIG. 2. The PMIC may include or correspond to the PMIC 222 of FIG. 2, the primary PMIC 332 or the secondary PMIC 334 of FIG. 3, any of the PMICs 432 of FIG. 4, the primary PMIC 532 or the secondary PMIC 534 of FIG. 5, the primary PMIC (PMIC (P)) or the secondary PMIC (PMIC (S)) of FIG. 3, the primary PMIC 714 or the secondary PMIC 716 of FIG. 7, or the primary PMIC 814 of FIG. 8.

At block 908, the method 900 includes collapsing, by the primary PMIC, SoC power rails as part of the PBS operations. For example, the primary PMIC, executes a deep sleep PBS and performs deep sleep PBS operations, some of which include collapsing one or more SoC power rails, as described with reference to FIGS. 2-8. To illustrate, the primary PMIC disconnects the logic rail, the XO rail, and the memory rail from a power source, as described with reference to FIGS. 2-8. The SoC power rails may include or correspond to any power delivery rail of the SoC, such as one or more of a logic rail (e.g., LX or CX rails), a crystal oscillator (XO) rail (e.g., XO rail), or a memory rail (e.g., MX rail) of each chiplet/die or the SoC in general.

In a first aspect, a system-on-chip (SoC) includes at least one processor and a memory coupled to the at least one processor. The at least one processor is configured to cause the SoC to: initiate, by an application processor subsystem (APSS) of the SoC, deep sleep mode entry based on determining a deep sleep entry trigger has been satisfied; coordinate, between a primary chiplet and a secondary chiplet of the SoC, to collapse subsystems of the primary and secondary chiplets and to put DDR memory of the SoC into a self-refresh mode; trigger, by the primary chiplet, programable boot sequence (PBS) operations of a primary power management integrated controller (PMIC) of the primary chiplet; and collapse, by the primary PMIC, SoC power rails as part of the PBS operations.

In a second aspect, alone or in combination with the first aspect, the deep sleep mode corresponds to a sleep state where DDR memory of the SoC is in a self-refresh state and all SoC power rails are off.

In a third aspect, alone or in combination with one or more of the above aspects, the at least one processor is further configured to cause the SoC to: send, by the primary PMIC, a notification to an EIM indicating deep sleep entry completion responsive to completion of the PBS operations.

In a fourth aspect, alone or in combination with one or more of the above aspects, the SoC has a homogeneous architecture, and wherein the SoC includes multiple chiplets of a same type.

In a fifth aspect, alone or in combination with one or more of the above aspects, the at least one processor is further configured to cause the SoC to: determine, by the APSS, to enter deep sleep based on satisfying one or more deep sleep conditions, wherein the one or more deep sleep conditions include duration of parking, location, garage mode; and notify, by the APSS, subsystems of the primary chiplet and subsystems of the secondary chiplet to enter deep sleep.

In a sixth aspect, alone or in combination with one or more of the above aspects, at least one processor is further configured to cause the SoC to: terminate, by the subsystems of the primary chiplet and the subsystems of the secondary chiplet, task execution based on and responsive to receipt of a notification to enter deep sleep; and remove, by the subsystems of the primary chiplet and the subsystems of the secondary chiplet, votes for one or more chiplet resources, wherein the one or more chiplet resources include a CX power rail resource, a MX power rail resource, or a DDR bandwidth resource.

In a seventh aspect, alone or in combination with one or more of the above aspects, the at least one processor is further configured to cause the SoC to: vote, by the subsystems of the primary chiplet and the subsystems of the secondary chiplet, vote for deep sleep to the deep sleep entity; and send, by the subsystems of the primary chiplet and the subsystems of the secondary chiplet, an acknowledgment indicating a vote to enter deep sleep to APSS, wherein the acknowledgment enables completion of the deep sleep entry.

In an eighth aspect, alone or in combination with one or more of the above aspects, the at least one processor is further configured to cause the SoC to: receive, by the APSS, the acknowledgments from all the subsystems; enter, by the APSS, a low power mode and removes votes on shared resources, the shared resources including a DDR bandwidth resource; and vote, by the APSS, for deep sleep entry to the deep sleep entity.

In a ninth aspect, alone or in combination with one or more of the above aspects, the subsystems are not active and wherein the APSS is the last entity remaining active after the APSS votes for deep sleep to the deep sleep entity.

In a tenth aspect, alone or in combination with one or more of the above aspects, the at least one processor is further configured to cause the SoC to: determine, by a primary DDR manager of the primary chiplet, whether a DDR aggregate bandwidth of a primary DDR memory of the primary chiplet is zero; and transition, by the primary DDR manager, the primary DDR memory to a self refresh mode.

In an eleventh aspect, alone or in combination with one or more of the above aspects, the at least one processor is further configured to cause the SoC to: determine, by a secondary DDR manager of the secondary chiplet, whether a DDR aggregate bandwidth of a secondary DDR memory of the secondary chiplet is zero; and transition, by the secondary DDR manager, the secondary DDR memory to a self refresh mode.

In a twelfth aspect, alone or in combination with one or more of the above aspects, the at least one processor is further configured to cause the SoC to: send, by the primary DDR manager, a vote to a primary deep sleep entity of the primary chiplet based on the primary DDR memory transitioning to the self refresh mode; and send, by the secondary DDR manager, a vote to a secondary deep sleep entity based on the secondary DDR memory transitioning to the self refresh mode.

In a thirteenth aspect, alone or in combination with one or more of the above aspects, the at least one processor is further configured to cause the SoC to: trigger, by the primary chiplet, the deep sleep logic once the deep sleep mode is aggregated; and coordinate, by the primary chiplet, with Backend Only deep sleep logic on the secondary chiplet to trigger deep sleep logic on the secondary chiplet.

In a fourteenth aspect, alone or in combination with one or more of the above aspects, the at least one processor is further configured to cause the SoC to: trigger, by the deep sleep entity to the AOSS Wake/Sleep Manager (AWSM), a deep sleep branch event based on all clients being in an idle state; and perform, by the AWSM based on receipt of the deep sleep branch event trigger, a deep sleep specific sequence and resource voting, wherein the deep sleep specific sequence triggers a deep sleep PBS rather than a rock bottom sleep (RBS) PBS.

In a fifteenth aspect, alone or in combination with one or more of the above aspects, the at least one processor is further configured to cause the SoC to: coordinate, between the primary PMIC and a secondary PMIC of the secondary chiplet, to execute PBS operations on chiplets of the SoC and to collapse the SoC power rails.

In a sixteenth aspect, alone or in combination with one or more of the above aspects, the at least one processor is further configured to cause the SoC to: trigger, by the primary PMIC during the PBS operation, PBS operations on the non-primary PMICs, including the secondary PMIC.

In a seventeenth aspect, alone or in combination with one or more of the above aspects, the at least one processor is further configured to cause the SoC to: perform, by the non-primary PMICs, the PBS operations responsive to receipt of a PBS trigger (which triggers the PBS operations); and transmit by the non-primary PMICs, an acknowledgment to the primary PMIC indicating completion of the PBS operations.

In an eighteenth aspect, alone or in combination with one or more of the above aspects, the at least one processor is further configured to cause the SoC to: receive, by the primary PMIC, the acknowledgments from the non-primary PMICs, including the secondary PMIC, responsive to execution and completion of the PBS operations; and confirm, by the primary PMIC, deep sleep entry to EIM to indicate the deep sleep entry completion based on and responsive to receipt of the acknowledgments.

In a nineteenth aspect, alone or in combination with one or more of the above aspects, the primary chiplet is configured to control actions of the secondary chiplet.

In a twentieth aspect, alone or in combination with one or more of the above aspects, the primary PMIC is the only PMIC of the SoC and configured to control all dies/chiplets of the SoC.

In another aspect, a method for deep sleep for a system-on-chip (SoC), the method comprising: initiating, by an application processor subsystem (APSS) of the SoC, deep sleep mode entry based on determining a deep sleep entry trigger has been satisfied; coordinating, between a primary chiplet and a secondary chiplet of the SoC, to collapse subsystems of the primary and secondary chiplets and to put DDR memory of the SoC into a self-refresh mode; triggering, by the primary chiplet, programable boot sequence (PBS) operations of a primary power management integrated controller (PMIC) of the primary chiplet; and collapsing, by the primary PMIC, SoC power rails as part of the PBS operations.

In yet another aspect, a system-on-chip (SoC) includes at least one processor and a memory coupled to the at least one processor. The at least one processor is configured to cause the SoC to: initiate, by an application processor subsystem (APSS) of the SoC, deep sleep mode entry based on determining a deep sleep entry trigger has been satisfied; coordinate, between a primary chiplet and a secondary chiplet of the SoC, to collapse subsystems of the primary and secondary chiplets and to put DDR memory of the SoC into a self-refresh mode; trigger, by the primary chiplet, programable boot sequence (PBS) operations of a primary power management integrated controller (PMIC) of the primary chiplet; and coordinate, between the primary PMIC and a secondary PMIC of the secondary chiplet, to execute the PBS operations and second PBS operations of the secondary PMIC and to collapse SoC power rails.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A system-on-chip (SoC), comprising:

at least one processor; and a memory coupled to the at least one processor, wherein the at least one processor is configured to cause the SoC to:

initiate, by an application processor subsystem (APSS) of the SoC, deep sleep mode entry based on determining a deep sleep entry trigger has been satisfied;

coordinate, between a primary chiplet and a secondary chiplet of the SoC, to collapse subsystems of the primary and secondary chiplets and to put a primary double data rate (DDR) memory of the primary chiplet and a secondary DDR memory of the secondary chiplet into a self-refresh mode;

trigger, by the primary chiplet, programable boot sequence (PBS) operations of a primary power management integrated controller (PMIC) of the primary chiplet; and collapse, by the primary PMIC, SoC power rails as part of the PBS operations.

2. The SoC of claim 1, wherein the deep sleep mode corresponds to a sleep state where DDR memory of the SoC is in a self-refresh state, the memory power rail is at a retention level for self-refresh, and all other SoC power rails are off.

3. The SoC of claim 1, wherein the at least one processor is further configured to cause the SoC to:

send, by the primary PMIC, a notification to an electrically independent module (EIM) indicating deep sleep entry completion responsive to completion of the PBS operations.

4. The SoC of claim 1, wherein the SoC has a homogeneous architecture, and wherein the SoC includes multiple chiplets of a same type.

5. The SoC of claim 1, wherein the at least one processor is further configured to cause the SoC to: determine, by the APSS, to enter deep sleep based on satisfying one or more deep sleep conditions, wherein the one or more deep sleep conditions include a duration of parking, location or garage mode; and notify, by the APSS, subsystems of the primary chiplet and subsystems of the secondary chiplet to enter deep sleep.

6. The SoC of claim 5, wherein the at least one processor is further configured to cause the SoC to:

terminate, by the subsystems of the primary chiplet and the subsystems of the secondary chiplet, task execution based on and responsive to receipt of a notification to enter deep sleep; and remove, by the subsystems of the primary chiplet and the subsystems of the secondary chiplet, votes for one or more chiplet resources, wherein the one or more chiplet resources include a logic power rail resource, a memory power rail resource, or a DDR bandwidth resource.

7. The SoC of claim 6, wherein the at least one processor is further configured to cause the SoC to:

vote, by the subsystems of the primary chiplet and the subsystems of the secondary chiplet, vote for deep sleep to a deep sleep entity; and send, by the subsystems of the primary chiplet and the subsystems of the secondary chiplet, an acknowledgment indicating a vote to enter deep sleep to APSS, wherein the acknowledgment enables completion of the deep sleep entry.

8. The SoC of claim 7, wherein the at least one processor is further configured to cause the SoC to:

receive, by the APSS, the acknowledgments from all the subsystems;

enter, by the APSS, a low power mode and remove votes on shared resources, the shared resources including a DDR bandwidth resource; and vote, by the APSS, for deep sleep entry to the deep sleep entity.

9. The SoC of claim 8, wherein the subsystems are not active and wherein the APSS is the last entity remaining active after the APSS votes for deep sleep to the deep sleep entity.

10. The SoC of claim 1, wherein the at least one processor is further configured to cause the SoC to:

determine, by a primary DDR manager of the primary chiplet, whether a DDR aggregate bandwidth of a primary DDR memory of the primary chiplet is zero; and transition, by the primary DDR manager, the primary DDR memory to a self refresh mode.

11. The SoC of claim 10, wherein the at least one processor is further configured to cause the SoC to:

determine, by a secondary DDR manager of the secondary chiplet, whether a DDR aggregate bandwidth of the secondary DDR memory of the secondary chiplet is zero; and transition, by the secondary DDR manager, the secondary DDR memory to a self refresh mode.

12. The SoC of claim 11, wherein the at least one processor is further configured to cause the SoC to:

send, by the primary DDR manager, a vote to a primary deep sleep entity of the primary chiplet based on the primary DDR memory transitioning to the self refresh mode; and send, by the secondary DDR manager, a vote to a secondary deep sleep entity based on the secondary DDR memory transitioning to the self refresh mode.

13. The SoC of claim 12, wherein the at least one processor is further configured to cause the SoC to:

trigger, by the primary chiplet, deep sleep logic once the deep sleep mode is aggregated; and coordinate, by the primary chiplet, with Backend Only deep sleep logic on the secondary chiplet to trigger deep sleep logic on the secondary chiplet.

14. The SoC of claim 13, wherein the at least one processor is further configured to cause the SoC to:

trigger, by the deep sleep entity to an always-on subsystems (AOSS) Wake/Sleep Manager (AWSM), a deep sleep branch event based on all clients being in an idle state; and perform, by the AWSM based on receipt of the deep sleep branch event trigger, a deep sleep specific sequence and resource voting, wherein the deep sleep specific sequence triggers a deep sleep PBS rather than a rock bottom sleep (RBS) PBS.

15. The SoC of claim 1, wherein the at least one processor is further configured to cause the SoC to:

coordinate, between the primary PMIC and a secondary PMIC of the secondary chiplet, to execute PBS operations on chiplets of the SoC and to collapse the SoC power rails.

16. The SoC of claim 15, wherein the at least one processor is further configured to cause the SoC to:

trigger, by the primary PMIC during the PBS operation, PBS operations on non-primary PMICs, including the secondary PMIC.

17. The SoC of claim 16, wherein the at least one processor is further configured to cause the SoC to:

perform, by the non-primary PMICs, the PBS operations responsive to receipt of a PBS trigger which triggers PBS operations on the non-primary PMICs; and transmit by the non-primary PMICs, an acknowledgment to the primary PMIC indicating completion of the PBS operations.

18. The SoC of claim 17, wherein the at least one processor is further configured to cause the SoC to:

receive, by the primary PMIC, the acknowledgments from the non-primary PMICs, including the secondary PMIC, responsive to execution and completion of the PBS operations; and confirm, by the primary PMIC, deep sleep entry to EIM to indicate the deep sleep entry completion based on and responsive to receipt of the acknowledgments.

19. A method for deep sleep for a system-on-chip (SoC), the method comprising:

initiating, by an application processor subsystem (APSS) of the SoC, deep sleep mode entry based on determining a deep sleep entry trigger has been satisfied;

coordinating, between a primary chiplet and a secondary chiplet of the SoC, to collapse subsystems of the primary and secondary chiplets and to put a primary double data rate (DDR) memory of the primary chiplet and a secondary DDR memory of the secondary chiplet into a self-refresh mode;

triggering, by the primary chiplet, programable boot sequence (PBS) operations of a primary power management integrated controller (PMIC) of the primary chiplet; and collapsing, by the primary PMIC, SoC power rails as part of the PBS operations.

20. A system-on-chip (SoC), comprising:

at least one processor; and a memory coupled to the at least one processor, wherein the at least one processor is configured to cause the SoC to:

initiate, by an application processor subsystem (APSS) of the SoC, deep sleep mode entry based on determining a deep sleep entry trigger has been satisfied;

coordinate, between a primary chiplet and a secondary chiplet of the SoC, to collapse subsystems of the primary and secondary chiplets and to put a primary double data rate (DDR) memory of the primary chiplet and a secondary DDR memory of the secondary chiplet into a self-refresh mode;

trigger, by the primary chiplet, programable boot sequence (PBS) operations of a primary power management integrated controller (PMIC) of the primary chiplet; and coordinate, between the primary PMIC and a secondary PMIC of the secondary chiplet, to execute the PBS operations and second PBS operations of the secondary PMIC and to collapse SoC power rails.

* * * * *